United States Patent
Kakimoto et al.

(10) Patent No.: US 7,684,302 B2
(45) Date of Patent: Mar. 23, 2010

(54) OPTICAL INFORMATION RECORDING DEVICE, OPTICAL INFORMATION RECORDING METHOD, AND SIGNAL PROCESSING CIRCUIT

(75) Inventors: Hiroya Kakimoto, Gunma (JP); Mitsuo Sekiguchi, Gunma (JP); Isao Matsuda, Gunma (JP); Masashi Yamada, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 1059 days.

(21) Appl. No.: 11/350,581

(22) Filed: Feb. 8, 2006

(65) Prior Publication Data
US 2006/0187788 A1    Aug. 24, 2006

(30) Foreign Application Priority Data
Feb. 8, 2005    (JP)    ............... 2005-031722

(51) Int. Cl.
    *G11B 7/00*     (2006.01)
(52) U.S. Cl. .................................. 369/59.12
(58) Field of Classification Search ............. 369/47.53, 369/59.11, 59.12, 59.13, 59.14, 59.1, 59.15, 369/59.2, 116
See application file for complete search history.

(56) References Cited

U.S. PATENT DOCUMENTS

| | | | |
|---|---|---|---|
| 7,280,455 B2 * | 10/2007 | Ohkubo | 369/59.21 |
| 7,496,014 B2 * | 2/2009 | Sekiguchi et al. | 369/47.53 |
| 7,529,169 B2 * | 5/2009 | Nakajo | 369/59.12 |
| 2005/0243670 A1 | 11/2005 | Kakimoto et al. | |
| 2005/0265184 A1 | 12/2005 | Sekiguchi et al. | |

FOREIGN PATENT DOCUMENTS

| | | |
|---|---|---|
| JP | 2003-15129 | 1/2003 |
| JP | 2003-30837 | 1/2003 |
| JP | 2004-13978 | 1/2004 |
| JP | 2004-63024 | 2/2004 |
| JP | 2004-110995 | 4/2004 |
| JP | 2004-152473 | 5/2004 |
| JP | 2004-213759 | 7/2004 |
| JP | 2004-280876 | 10/2004 |

* cited by examiner

*Primary Examiner*—Nabil Z Hindi
(74) *Attorney, Agent, or Firm*—Knobbe Martens Olson & Bear LLP

(57) ABSTRACT

The present invention enables a recording condition closer to an optimum to be obtained even for media unknown to a drive. The present invention provides a method that is especially effective for the case where it is applied to a code identification scheme, such as PRML in which code identification is performed on the basis of information on the amplitude of an RF signal. A condition for a recording pulse comprised of a top pulse, an intermediate pulse and a last pulse is configured in a predetermined order, that is, a reference condition is first determined by a test recording involving an examination of recording quality and changes in conditions for a power and a pulse width, then a condition for the last pulse is determined by a test recording using the reference condition, and subsequently a condition for the intermediate pulse is determined using the reference condition and the last pulse. A phase shift is corrected by a test recording using the recording pulse obtained by configuring the above conditions.

6 Claims, 26 Drawing Sheets

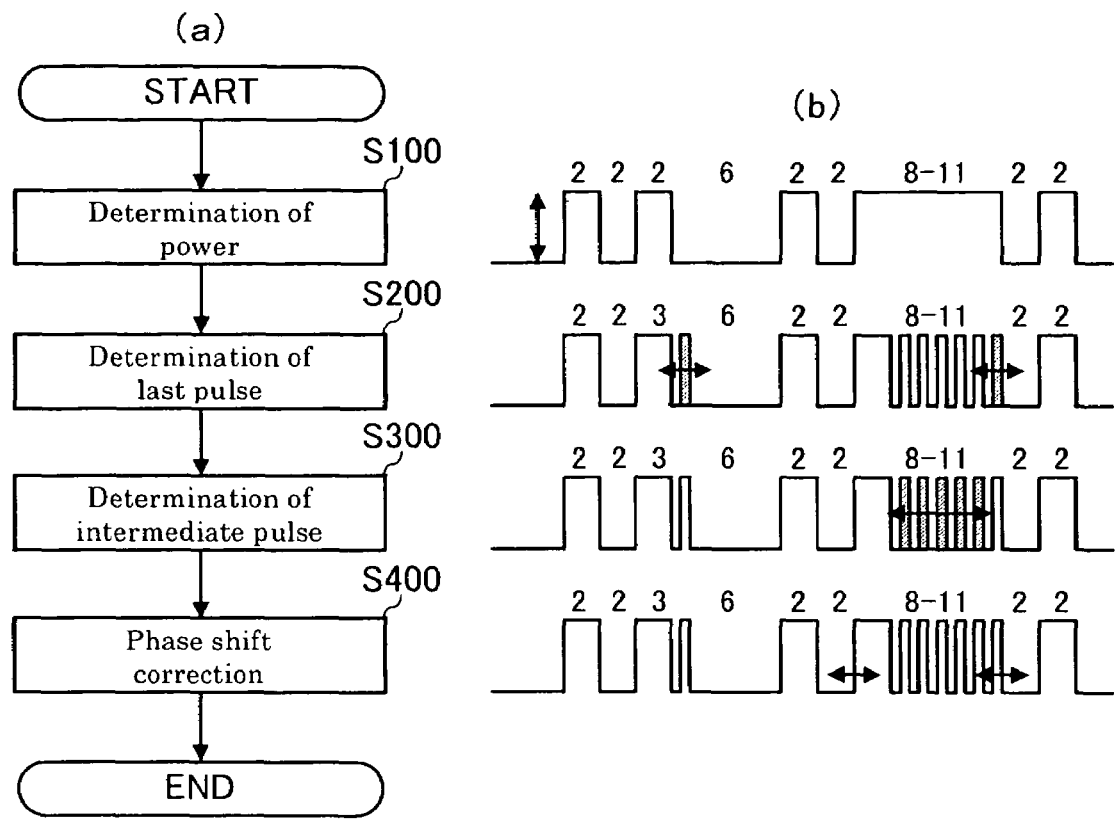
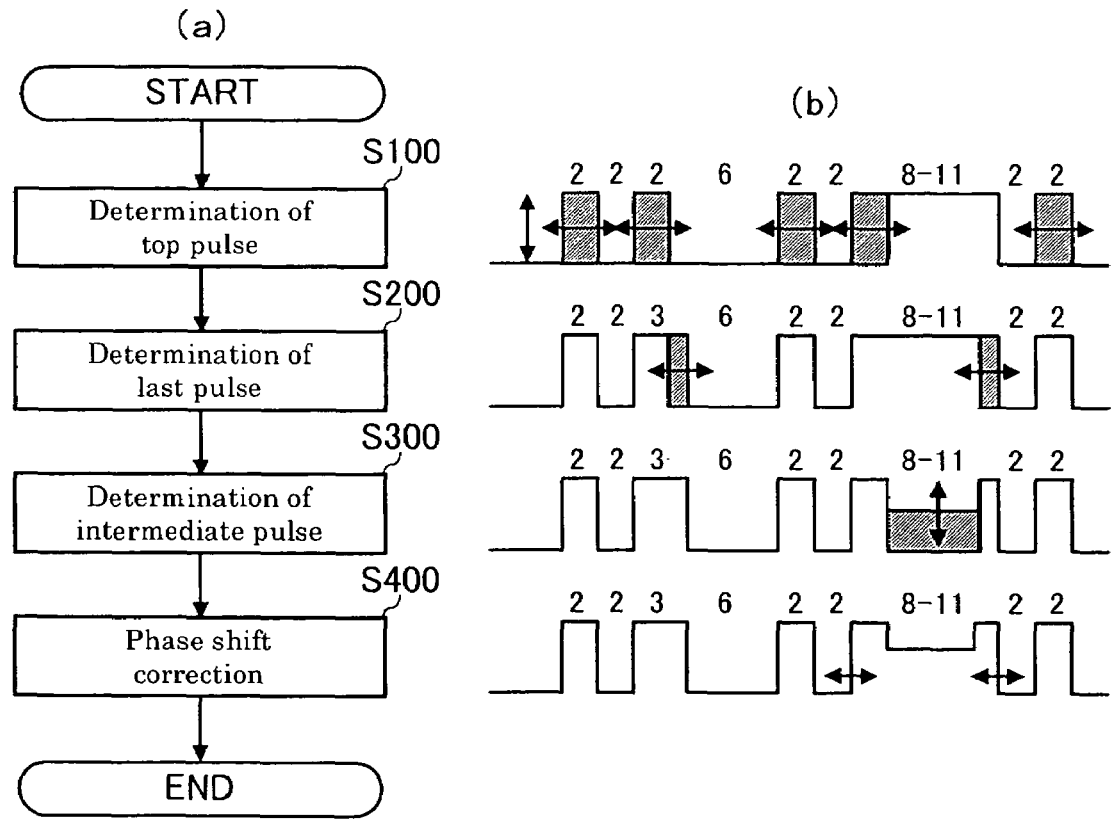

Determination flow of reference condition

FIG. 9
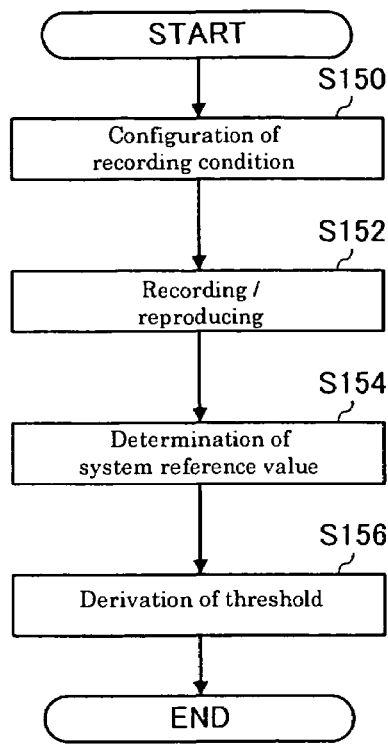
FIG. 10
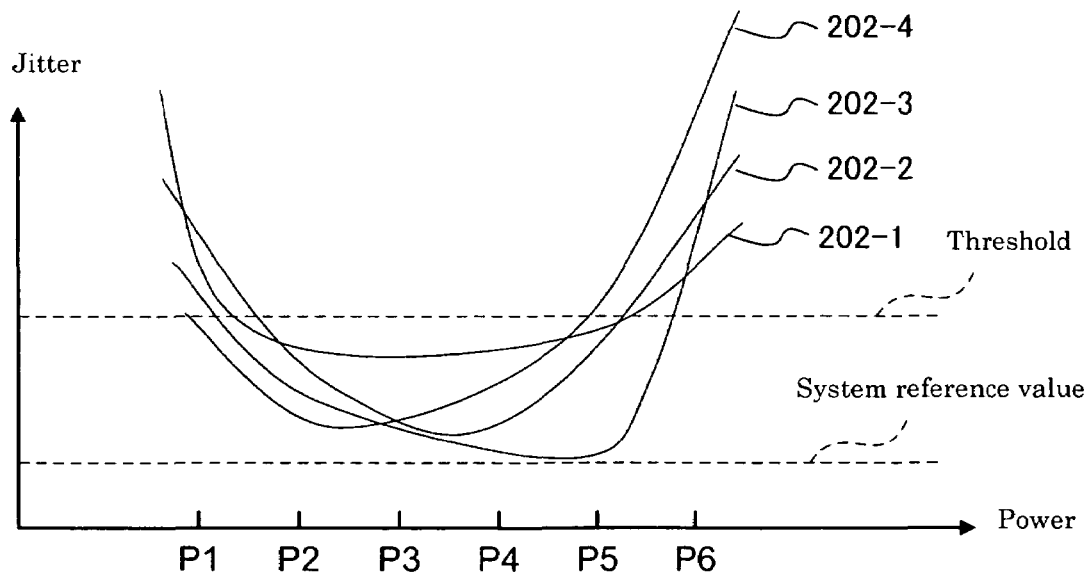
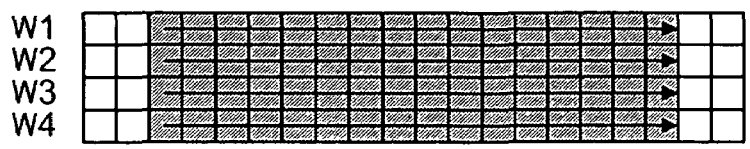

FIG. 11
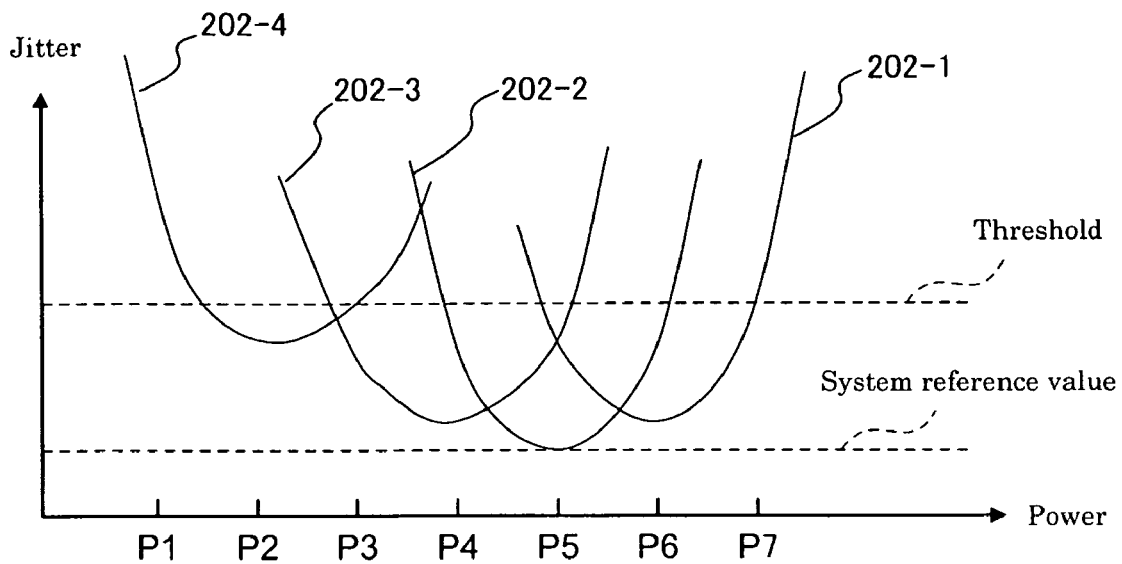
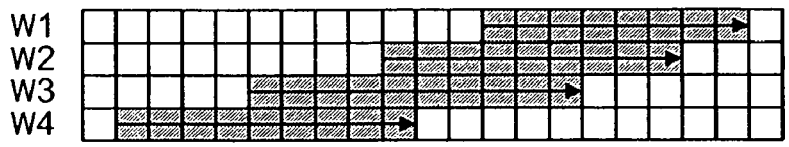
FIG. 12
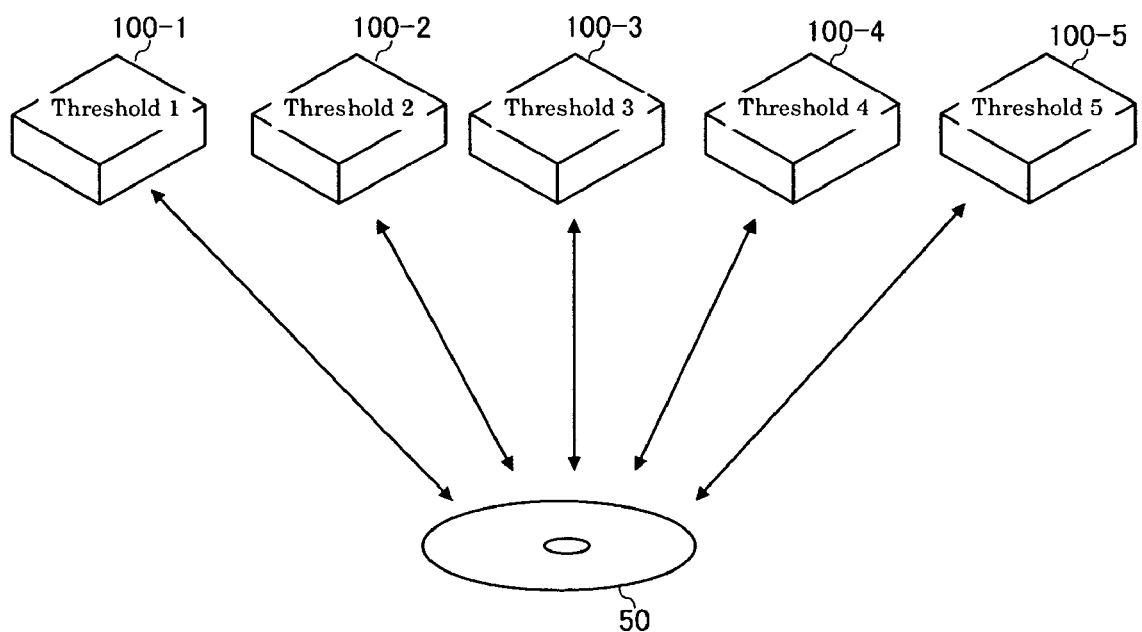

FIG. 13
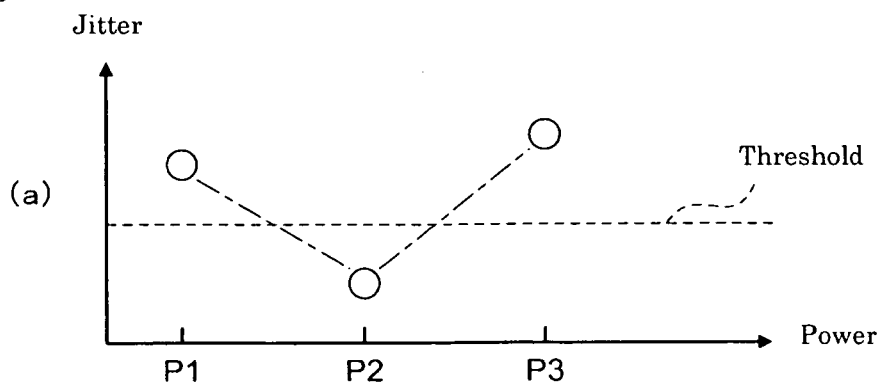
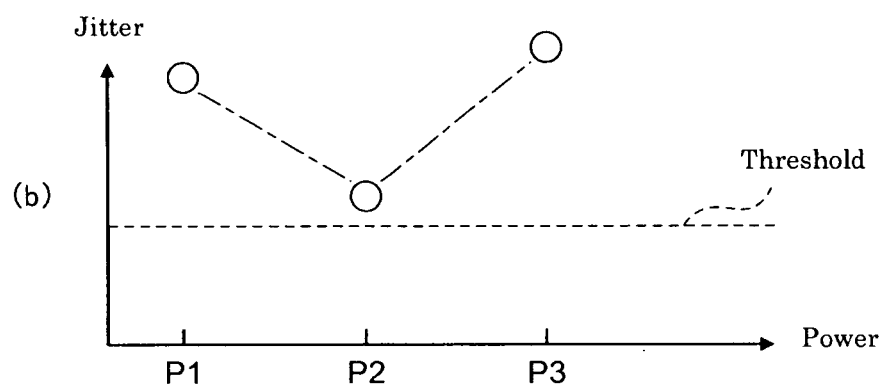
FIG. 14
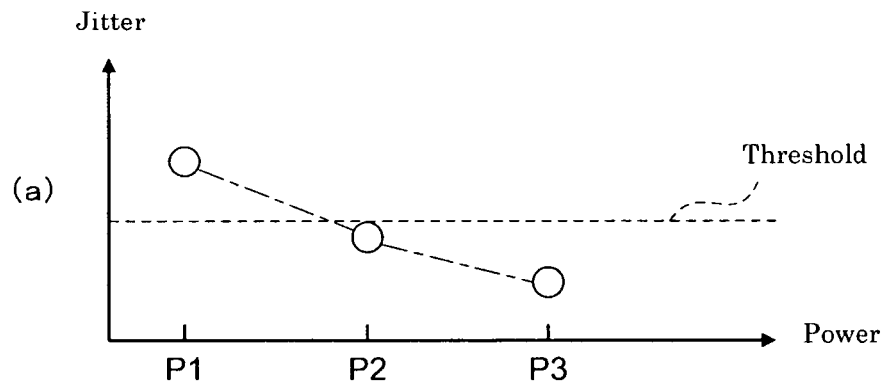
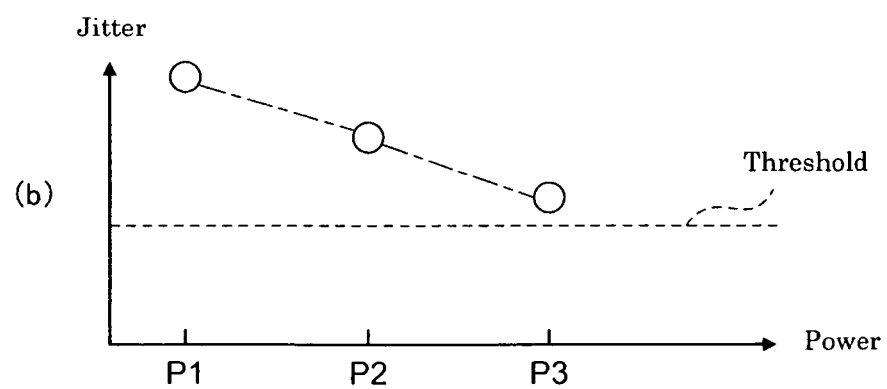

FIG. 17
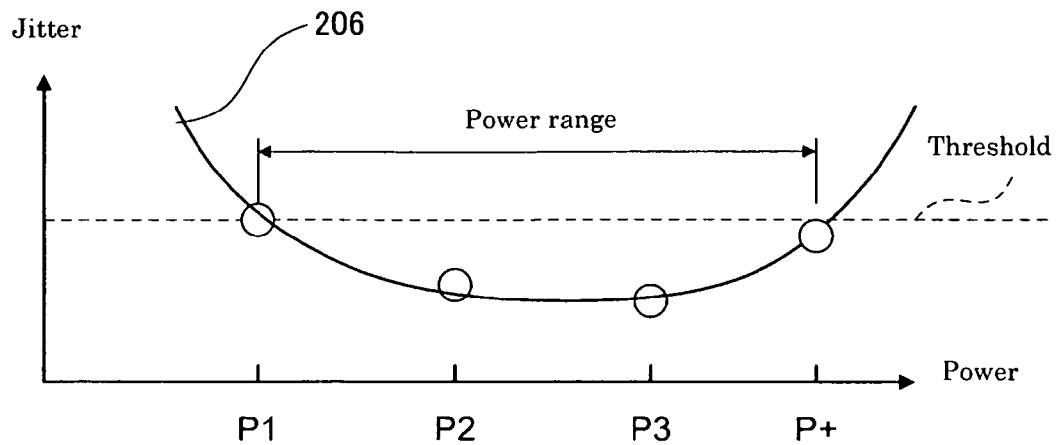
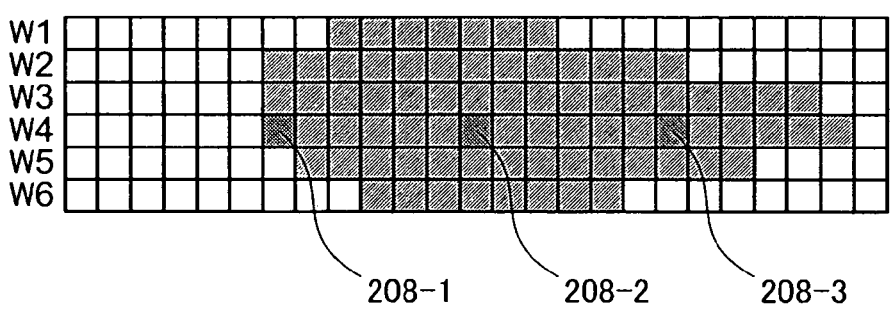
FIG. 18
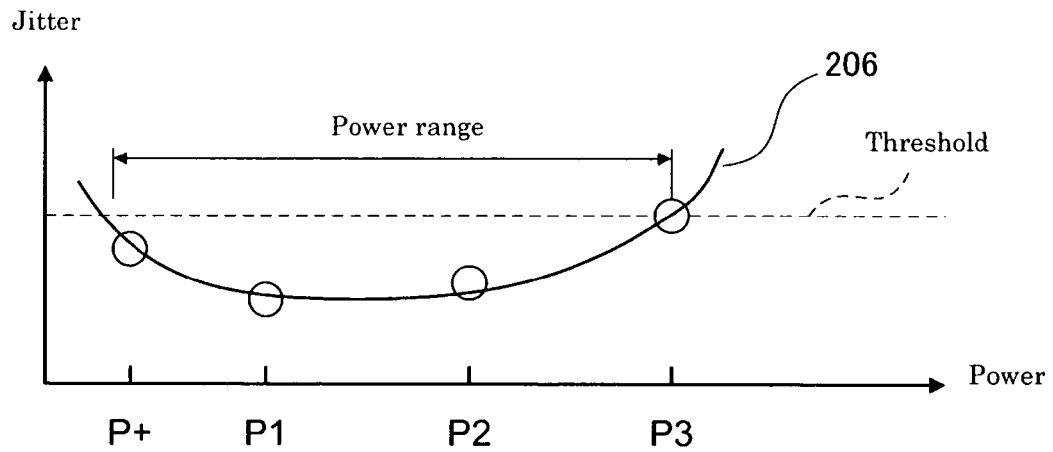
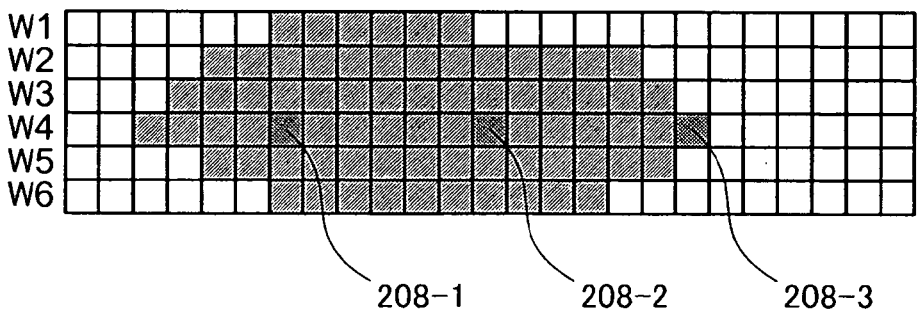

FIG. 19

| Pattern | Shape | Relation with threshold | Prediction of recording characteristics | Pulse width |
|---|---|---|---|---|
| 1 | Given | Max. jitter ≤ threshold | Same sensitivity | ±0.2T |
| 2 | Downwardly convex | Min. jitter ≤ threshold | Same sensitivity | ±0.1T |
| 3 | Downwardly convex | Min. jitter > threshold | Same sensitivity and large difference in feature | ±0.2T |
| 4 | Downward-sloping | Min. jitter ≤ threshold | Slightly lower sensitivity | +0.1T, +0.2T |
| 5 | Downward-sloping | Min. jitter > threshold | Significantly lower sensitivity | +0.2T, +0.4T |
| 6 | Upward-sloping | Min. jitter ≤ threshold | Slightly higher sensitivity | −0.1T, −0.2T |
| 7 | Upward-sloping | Min. jitter > threshold | Significantly higher sensitivity | −0.2T, −0.4T |
| 8 | Upwardly convex | Max. jitter > threshold | NG | ±0.2T |

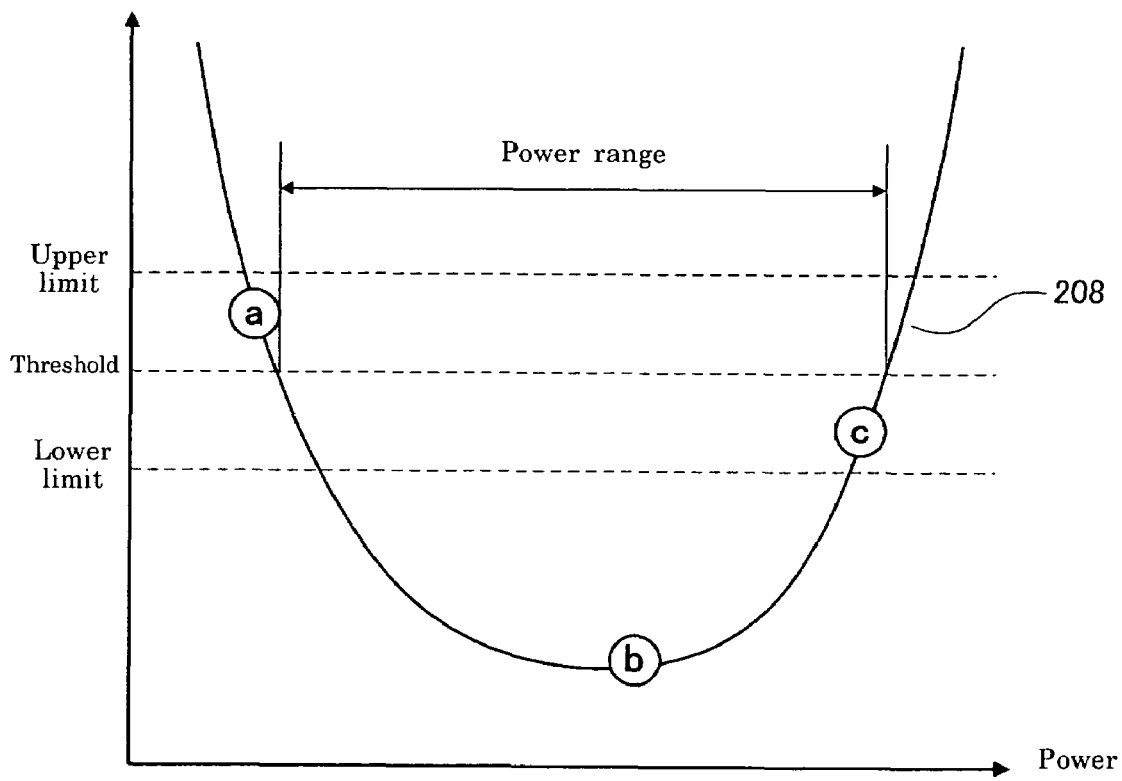

FIG. 20

Determination flow of intermediate pulse (a) Recording mark
(b) Reproduced RF
(c) Binarization
(d) Clock
(e) Count result

| No | Polarity | Count result |
|---|---|---|
| 1 | Mark | 5 |
| 2 | Space | 6 |
| 3 | Mark | 9 |
| 4 | Space | 8 |
| 5 | Mark | 13 |
| 6 | Space | 8 |
| . | . | . |
| . | . | . |
| . | . | . |

(a) Mark length threshold

| DATA | Count |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) Space length threshold

| DATA | Count |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

FIG. 37
(a) Phase shift
detection on
front side of mark
FPS
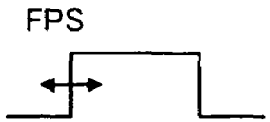
| Search pattern | MxT threshold | | SyT threshold | | MzT threshold | |
|---|---|---|---|---|---|---|
| | min | max | min | max | min | max |
| ≥M6 − S4 − M3 | 26 | 100 | 10 | 18 | 2 | 9 |
| ≥M6 − S4 − M4 | 26 | 100 | 10 | 18 | 9 | 18 |
| ≥M6 − S4 − M5 | 26 | 100 | 10 | 18 | 18 | 26 |
| ≥M6 − S4 − M6 | 26 | 100 | 10 | 18 | 26 | 35 |
| ... | ... | ... | ... | ... | ... | ... |
(b) Phase shift
detection on
rear side of mark
RPS
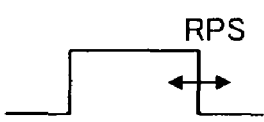
| Search pattern | MxT threshold | | SyT threshold | | MzT threshold | |
|---|---|---|---|---|---|---|
| | min | max | min | max | min | max |
| M3 − S4 − ≥M6 | 2 | 9 | 10 | 18 | 26 | 100 |
| M4 − S4 − ≥M6 | 9 | 18 | 10 | 18 | 26 | 100 |
| M5 − S4 − ≥M6 | 18 | 26 | 10 | 18 | 26 | 100 |
| M6 − S4 − ≥M6 | 26 | 35 | 10 | 18 | 26 | 100 |
| ... | ... | ... | ... | ... | ... | ... |

| No | Polarity | Count result |
|----|----------|--------------|
| 1  | Mark     | 5            |
| 2  | Space    | 6            |
| 3  | Mark     | 9            |
| ...| ...      | ...          |

(a) Reference pattern (b) Comparative pattern (c) Reference count result (d) Comparative count result (a) Ttopr correction amount

| Space before mark | Mark to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

(b) Tlastf correction amount

| Space after mark | Mark to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

OPTICAL INFORMATION RECORDING DEVICE, OPTICAL INFORMATION RECORDING METHOD, AND SIGNAL PROCESSING CIRCUIT

BACKGROUND OF THE INVENTION

1. Field of the Invention

The field relates to a device and a method for optical recording and a signal processing circuit, and more particularly, to a device and a method for optical recording and a signal processing circuit that are capable of optimizing a recording condition depending on the compatibility between a medium and a drive.

2. Description of the Related Technology

For recording onto an optical information recording medium such as CD-R or DVD-R (hereinafter referred to as "media" or a "medium"), the compatibility between a medium to be recorded on and a device to be used for recording (hereinafter referred to as a "drive") depends on each combination of them. This may be caused by the medium side factor wherein the optimum recording condition is varied by the difference in a recording material comprising the medium or the film formation variation during production, or by the drive side factor wherein the optimum recording condition is varied by the difference in a pickup device and/or a semiconductor laser comprising the drive or assembly variation during production. In fact, a suitable recording condition exists for each combination of a medium and a drive due to the combination of those factors.

Accordingly, in a conventional method, ID information on a medium type identifiable by a drive is stored in the medium as well as a recording condition prepared for each medium type is stored in the drive. When recording is actually performed, the ID information stored in the medium is read from the medium loaded to the drive, and a recording condition related to the ID information is used.

However, in the conventional method, suitable recording conditions can be selected for pre-verified known media, but prepared recording conditions may not be adequate to accommodate unknown media that are not pre-verified. Further, depending on the change in the recording environment such as a recording speed, disturbance, or change over time, the prepared recording conditions may not be adequate even for known media.

A method contemplated to accommodate such an unknown medium is described in Japanese Unexamined Patent Publications No. 2003-30837 and No. 2004-110995

As described in the paragraph [0020] of the Japanese Unexamined Patent Publication No. 2003-30837 as " . . . a phase error relative to a channel clock is detected for every recording pattern. A recording compensation parameter adjustment section 12 optimizes an emission waveform rule on the basis of the detection result at the phase error detection section 11," a method of detecting a phase error by comparing with a channel clock and of correcting the phase error is disclosed.

Also, the paragraph [0024] of the document describes that "Next, a test pattern for determining an emission waveform rule is recorded. The area wherein the test pattern is recorded is reproduced, and the relationship between a prepared emission waveform rule and a phase error amount is examined. In other words, the phase error amount in the combination of the length of each mark and the length of each space immediately before the mark is measured. An emission waveform rule wherein the phase error amount becomes zero is estimated from the measured phase error amount, whereby a desired emission waveform rule is determined . . . ", disclosing a method for measuring a phase error amount for every combination of a mark and a space, and then estimating an emission waveform rule wherein the phase error amount becomes zero (see FIG. 8 and FIG. 12).

The method disclosed in the Japanese Unexamined Patent Publication No. 2003-30837 is effective for optimizing a strategy because a correction is made based on a phase error of a recording pattern.

Also, the paragraph [0045] of the Japanese Unexamined Patent Publication No. 2004-110995 describes that " . . . a top pulse corresponds to a 3T period and a non-multipulse corresponds to a 8T period are generated integrally (consecutively) . . . " and the paragraph [0046] of the document describes that " . . . the laser power for a write pulse is adjusted in two levels, and when the ratio between a laser power (a height value of the top pulse) Ph and a laser power (a height value of the non-multipulse) Pm is optimum, an optimum power can be obtained . . . ", suggesting the effectiveness of optimizing the Ph/Pm ratio.

On the other hand, the adoption of PRML (Partial Response and Maximum Likelihood) method has been examined as a code identification scheme in a high-density recording system using a blue laser. The PRML method requires configuring a recording condition using a metrics different from that in a conventional slicing method in order to provide a high-quality recording because code identification in the method is performed on the basis of information on the amplitude of an RF signal obtained by reproducing a recording pattern.

With regard to methods for configuring a recording condition on the basis of information on the amplitude of an RF signal, the following patent documents are known: Japanese Unexamined Patent Publication No. 2004-13978, 2004-280876, 2003-15129, 2004-63024, 2004-213759, and 2004-152473.

Japanese Unexamined Patent Publication No. 2004-13978 and 2004-280876 disclose methods in which conditions for a top pulse, an intermediate pulse, and a last pulse are determined using an asymmetry as an indicator. Japanese Unexamined Patent Publication No. 2003-15129, 2004-63024, and 2004-213759 disclose methods for determining a recording pulse condition based on the difference between an ideal waveform on the assumption of PRML and a reproduced waveform obtained from an actual recording. Japanese Unexamined Patent Publication No. 2004-152473 discloses a method for determining a start position of a top pulse using an asymmetry as an indicator as well as widths of a top pulse and an intermediate pulse using a jitter as an indicator.

However, because the method disclosed in the Japanese Unexamined Patent Publication No. 2003-30837 involves, as conventional methods, a fine adjustment of a prepared strategy stored in a drive, it is difficult to provide favorable recording quality for media to which prepared strategies are not applicable.

Also, in the method disclosed in the Japanese Unexamined Patent Publication No. 2004-110995, as described in the paragraph [0067] of the document, the initial values of Ph and Pm are tentatively set based on values stored in a drive or a medium, and then the Ph/Pm ratio is calculated. Accordingly, as in the case of the Japanese Unexamined Patent Publication No. 2003-30837, it is difficult to provide favorable recording quality for media to which the tentatively set values are not applicable.

Furthermore, in the methods of Japanese Unexamined Patent Publication No. 2004-13978 and 2004-280876, because conditions for a top pulse and a last pulse are simultaneously determined using the same indicator, the shortest pulse that is most likely to cause an error is not optimized. Accordingly, the methods are amenable to disturbance and likely to cause an error, and therefore cannot easily provide a high-quality recording system with a large recording margin.

The methods disclosed in Japanese Unexamined Patent Publication No. 2003-15129, 2004-63024, and 2004-213759 also cannot easily provide a high-quality recording system with a large recording margin, similar to the methods in the Patent Documents 3 and 4, because a correction is made only for each of commonly known pulse shapes and therefore it is difficult to identify which part of a pulse shape is effective for which indicator.

The method disclosed in Japanese Unexamined Patent Publication No. 2004-152473 also cannot easily provide a high-quality recording system with a large recording margin, similar to the methods in the Patent Documents 3 and 4, because the widths of a top pulse and an intermediate pulse are simultaneously determined using a jitter as an indicator although a start position of the top pulse is determined using an asymmetry as an indicator.

It is therefore the object of the present invention to provide an optimization method of a recording condition depending on the compatibility between a medium and a drive, which is especially effective for the case where a code identification scheme is assumed, such as PRML in which code identification is performed on the basis of information on the amplitude of an RF signal.

SUMMARY OF THE INVENTION

In order to achieve the above object, an invention according to claim 1 is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein a condition for the last pulse is adjusted based on a relationship between a reproduction result of the shortest code and that of a second shortest code.

Adjusting a condition for the last pulse based on the reproduction results of the shortest code and the second shortest code, as described above, enables the determination accuracy around the shortest code that is likely to cause an error to be improved. Because the last pulse is highly likely to affect the second shortest code, the relationship between the shortest code and the second shortest code is preferably determined by adjusting the last pulse.

Preferably, the top pulse is configured correspondingly to the shortest mark that has the highest appearance rate and is difficult to be recorded. For example, when codes having 3T to 11T are defined as in a CD system, or when codes having 3T to 11T, and 14T are defined as in a DVD system, it is preferable to adapt a top pulse to correspond to a 3T code, while when codes having 2T to 8T are defined as in a blue-ray system, or when codes having 2T to 11T are defined as in a HD-DVD system, it is preferable to adapt a top pulse to correspond to a 2T code.

Further, a succeeding pulse comprised of an intermediate pulse and a last pulse may be either a non-multipulse or a multipulse, and it is preferable that a recording pulse is optimized by using a power ratio between a top pulse and a succeeding pulse in the case of a non-multipulse, while in the case of a multipulse, it is preferable that a recording pulse is optimized by adjusting a duty for each of a plurality of divided pulses that configure a succeeding pulse.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein a condition for the last pulse is adjusted based on a reproduction result of a recording pattern recorded onto the medium, the recording pattern including the shortest code and a second shortest code.

Adjusting a condition for the last pulse based on the reproduction result of the recording pattern including the shortest code and the second shortest code, as described above, enables the determination accuracy around the shortest code that is likely to cause an error to be improved. For the above recording pattern, a specific pattern in which the shortest code, the second shortest code, and other codes are arranged in a predetermined order may be used, or a random pattern in which these codes are arranged in random order may be used.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein a condition for the intermediate pulse is adjusted based on a relationship between a reproduction result of the shortest code and/or the second shortest code and that of a code of which the amplitude of a reproduction signal is comparable to that of a longest code.

Adjusting a condition for the intermediate pulse based on the reproduction result of each of the above codes, as described above, enables a balance between a shorter code and a longer code to be improved. Because the intermediate pulse is a parameter for determining a condition for a length of each code from a shorter code to a longer code, the relationship between the shorter code and the longer code is preferably determined by adjusting the intermediate pulse.

The code of which the amplitude of a reproduction signal is comparable to that of the longest code means that the amplitude level of an RF signal obtained by reproducing the code is comparable to that obtained by reproducing the longest code, and corresponds to a code of which the amplitude of a reproduction signal is saturated. For example, a 11T code is the longest code in the recording system, and if a reproduction amplitude level of a code having a length of 8T or longer is comparable, each of 8T to 11T codes corresponds to the code of which the amplitude of a reproduction signal is comparable to that of the longest code.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein a condition for the intermediate pulse is adjusted based on a reproduction result of a recording pattern recorded onto the medium, the recording pattern including the shortest code and/or the second shortest code and a code of which the amplitude of a reproduction signal is comparable to that of a longest code.

Adjusting a condition for the intermediate pulse based on the reproduction result of the recording pattern including the both codes, as described above, enables a balance between a shorter code and a longer code to be improved. For the above recording pattern, a specific pattern in which the shortest code, the second shortest code, and other codes are arranged in a predetermined order may be used, or a random pattern in which these codes are arranged in random order may be used.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein after a reference condition for the recording pulse is configured, a condition for the last pulse is configured, followed by a configuration of a condition for the intermediate pulse.

Configuring conditions in the order of the reference condition, the condition for the last pulse, and the condition for the intermediate pulse, as described above, enables a preferable recording condition for any pulse from the shortest pulse to the longest pulse to be obtained. That is, because with increasing a code length, an effect on recording quality is increased in the order of the reference condition, the last pulse and the intermediate pulse, and a frequency of errors is increased in the order from a pulse having a shorter code, configuring the conditions in the above-described order enables an optimum recording condition, which has a large recording margin and is effective for high-quality recording, to be obtained.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein after a reference condition for the recording pulse is configured, a condition for the intermediate pulse is configured, followed by a configuration of a condition for the last pulse.

Configuring conditions in the order of the reference condition, the condition for the intermediate pulse, and the condition for the last pulse, as described above, enables a preferable recording condition for any pulse from the shortest pulse to the longest pulse to be obtained. That is, because with increasing a code length, an effect of a succeeding pulse on recording quality is incresed, configuring the conditions in the above-described order enables an optimum recording condition, which has a large recording margin and is effective for high-quality recording, to be obtained.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein the recording pulse for each code is configured by configuring a condition for the last pulse after a reference condition for the recording pulse is configured and then configuring a condition for the intermediate pulse; multiple types of recording patterns in which pulses corresponding to predetermined codes from the configured recording pulses are arranged in a predetermined order are prepared; and a condition for the recording pulses is configured for each of the prepared recording patterns.

Adjusting for each of the predetermined recording patterns after a condition for the recording pulse corresponding to each code is configured, as described above, enables an optimum solution that takes an effect of the recording patterns into consideration to be derived with a smaller number of test recordings. In the recording patterns to be taken into consideration, an anteroposterior relationship such as a length of a preceding space, a length of a succeeding space, or a length of a prior mark is preferably taken into consideration.

Another embodiment is an optical information recording device that records information onto an optical recording medium by irradiating a laser beam based on a recording pulse configured correspondingly to each of multiple types of codes, the recording pulse being comprised of a top pulse, an intermediate pulse, and a last pulse, wherein the recording pulse for each code is configured by configuring a condition for the intermediate pulse after a reference condition for the recording pulse is configured and then configuring a condition for the last pulse; multiple types of recording patterns in which pulses corresponding to predetermined codes from the configured recording pulses are arranged in a predetermined order are prepared; and a condition for the recording pulses is configured for each of the prepared recording patterns.

Adjusting for each of the predetermined recording patterns after a condition for the recording pulse corresponding to each code is configured, as described above, enables an optimum solution that takes an effect of the recording patterns into consideration to be derived with a smaller number of test recordings. In the recording patterns to be taken into consideration, an anteroposterior relationship such as a length of a preceding space, a length of a succeeding space, or a length of a prior mark is preferably taken into consideration.

BRIEF DESCRIPTION OF DRAWINGS

FIG. 5 is a schematic diagram showing a fourth method for determining a recording pulse condition.

FIG. 6 is a schematic diagram showing a fifth method for determining a recording pulse condition.

FIG. 9 is a flowchart showing the details of a threshold determination step shown in FIG. 8.

FIG. 10 is a schematic diagram showing one example of the flow shown in FIG. 9.

FIG. 11 is a schematic diagram showing one example of the flow shown in FIG. 9.

FIG. 12 is a schematic diagram showing an example of a case where a threshold is calculated for each drive.

FIG. 13 is a schematic diagram showing an example wherein a concave pattern is obtained as a result of examining recording quality in the step S120 in FIG. 8.

FIG. 14 is a schematic diagram showing an example wherein a downward-sloping pattern is obtained as a result of examining recording quality in the step S120 in FIG. 8.

FIG. 17 is a schematic diagram showing an example of determining a test area as conducted in the step S122 for the case wherein a downward-sloping pattern is obtained in the step S120 in FIG. 8.

FIG. 18 is a schematic diagram showing an example of determining a test area as conducted in the step S122 for the case wherein an upward-sloping pattern is obtained at the step S120 in FIG. 8.

FIG. 19 is a diagram showing an example wherein the step S120 in FIG. 8 is conducted with eight patterns.

FIG. 20 is a schematic diagram showing a method of obtaining a power range to be used for the step S122 in FIG. 8 by curve approximation.

FIG. 37 is a schematic diagram showing a table configuration for searching a specific pattern to be used in the detection of front-side or backside phase shift length.

DETAILED DESCRIPTION OF CERTAIN EMBODIMENTS

Several embodiments of the present invention will hereinafter be described in detail with reference to accompanying drawings. The present invention may be modified from time to time and shall not be limited to the embodiments described herein.

Figure 1:
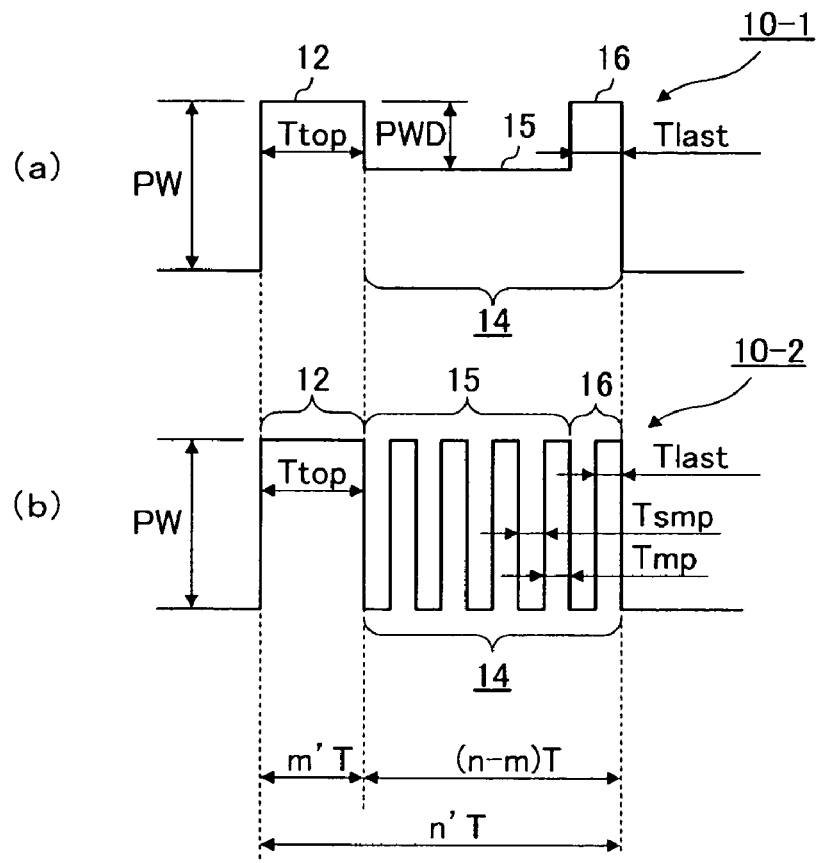
FIG. 1 is a schematic diagram illustrating the configuration of a recording pulse according to an embodiment.

FIG. 1 is a schematic diagram illustrating the configuration of a recording pulse according to one embodiment. FIG. 1(a) shows an example of a single pulse comprised of a single pulse pattern and (b) a multipulse comprised of a plurality of pulse patterns. As shown in the diagram, each of the single pulse 10-1 and the multipulse 10-2 is comprised of a top pulse 12 arranged at the front edge of the recording pulse and a succeeding pulse 14 following the top pulse. The succeeding pulse 14 comprises an intermediate pulse 15 following the top pulse 12 and a last pulse 16 arranged at the end of the recording pulse.

Assuming that the recording pulse 10-1 or 10-2 has a length of nT, the top pulse 12 has a length of mT, and the succeeding pulse 14 has a length of (n−m)T, where m and n take the values of m=2 and n=2 to 11 respectively in this embodiment, and T is a unit time defined by an optical disk system, of which frequency is determined by a clock signal.

A condition of the recording pulse 10-1 or 10-2 is determined by a test recording under the condition of loading an optical information recording medium (hereinafter referred to as a "medium" or a "disk") into an optical information recording device (hereinafter referred to as a "recording device" or a "drive").

An energy amount of the entire recording pulse is defined by the height of a main power PW, and an initial energy amount supplied to the initial position of a recording mark is defined by the length of a top pulse width Ttop. The main power PW preferably has the highest value in the recording pulse 10-1 or 10-2, and the top pulse width Ttop has a width that corresponds to the shortest recording mark having a length of 2T. Because the recording pulse with the shortest width has the highest appearance rate and significantly affects recording quality, optimum conditions for the power PW and the pulse width Ttop of the top pulse 12 are preferably determined first.

As a condition for the intermediate pulse 15 in the case of the single pulse 10-1, as shown in the diagram (a), a lower-power area where the power is lower than the main power PW by PWD is defined in the lower-power area whereby a recording mark is prevented from forming a tear drop shape. Similarly, in the case of the multipulse 10-2, as shown in the diagram (b), defining an intermediate pulse 15 width Tmp located between the top pulse 12 and the last pulse 16 or a duty ratio between Tmp and Tsmp prevents a recording mark from forming a tear drop shape.

A condition for the last pulse 16 is determined by adjusting a width Tlast of the last pulse 16 arranged at the end of a recording pulse. The determination of a condition for the succeeding pulse comprised of the intermediate pulse 15 and the last pulse 16 is conducted on the basis of the top pulse condition.

Figure 2:
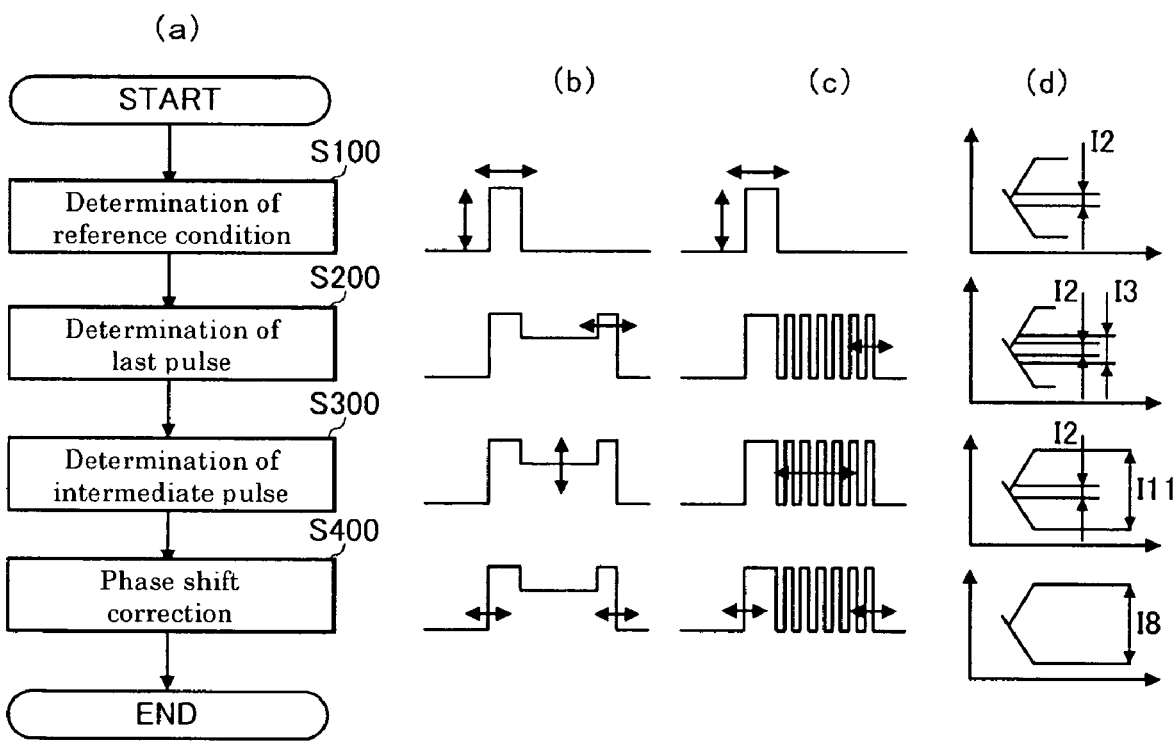
FIG. 2 is a schematic diagram showing a first method for determining a recording pulse condition.

FIG. 2 is a schematic diagram showing a first method for determining a recording pulse condition. FIG. 2(a) is a flowchart showing a determination procedure of the recording pulse condition, (b) illustrates a part to be adjusted for each step shown in the diagram (a) in a single pulse case, (c) illustrates a part to be adjusted for each step in (a) in a multipulse case, and (d) illustrates parameters to be used as indicators for each step in (a).

As shown in FIG. 2(a), to determine a recording pulse condition by this method, a reference condition for the recording pulse is determined first for each code (step S100). The reference condition can be configured by adjusting a power and a width of a top pulse to obtain a condition under which a shift amount for the amplitude I2 of the shortest code 2T equals to zero as shown in the step S100 of the diagram (b), (c), or (d).

In addition, for the above amplitude shift amount, an error value obtained in a detection pattern centering on a 2T pattern may be selected as an indicator from a recording result with a random or specific pattern, or the amplitude shift amount depending on a pattern may be used as an indicator.

Then, test recording under the reference condition allows a last pulse condition for recording to be determined (step S200). The last pulse condition can be configured by adjusting a width of the last pulse while fixing an intermediate pulse under a predetermined condition to obtain a condition under which an asymmetry 2T3T representing an asymmetry property between the amplitude value I2 of the shortest code 2T and that I3 of the second shortest code 3T equals to zero as shown in the step S200 of the diagram (b), (c), or (d).

Subsequently, a test recording by the use of the reference condition obtained at step S100 and the last pulse obtained at step S200 allows an intermediate pulse condition for recording to be determined (step S300). The intermediate pulse condition can be configured by adjusting an intermediate pulse power in a single pulse case or adjusting widths of divided pulses comprising an intermediate pulse in a multipulse case to obtain a condition under which an asymmetry 2T11T representing an asymmetry property between the amplitude values I2 of the shortest code 2T and that I11 of the longest code 11T equals to zero as shown in the step S300 of the diagram (b), (c), or (d).

Conducting the above steps S100 to S300 allows a recording pulse condition to be determined. Furthermore, a test recording using the determined recording pulse allows a phase shift of the recording pulse to be corrected (step S400). The phase shift can be corrected by adjusting a start position and an end position of the recording pulse to obtain a condition under which in this example, a shift amount for the amplitude value I8 of a relevant code 8T equals to zero. In addition, for the shift amount, the amplitude shift amount corresponding to a pattern around 8T is preferably used.

Figure 3:
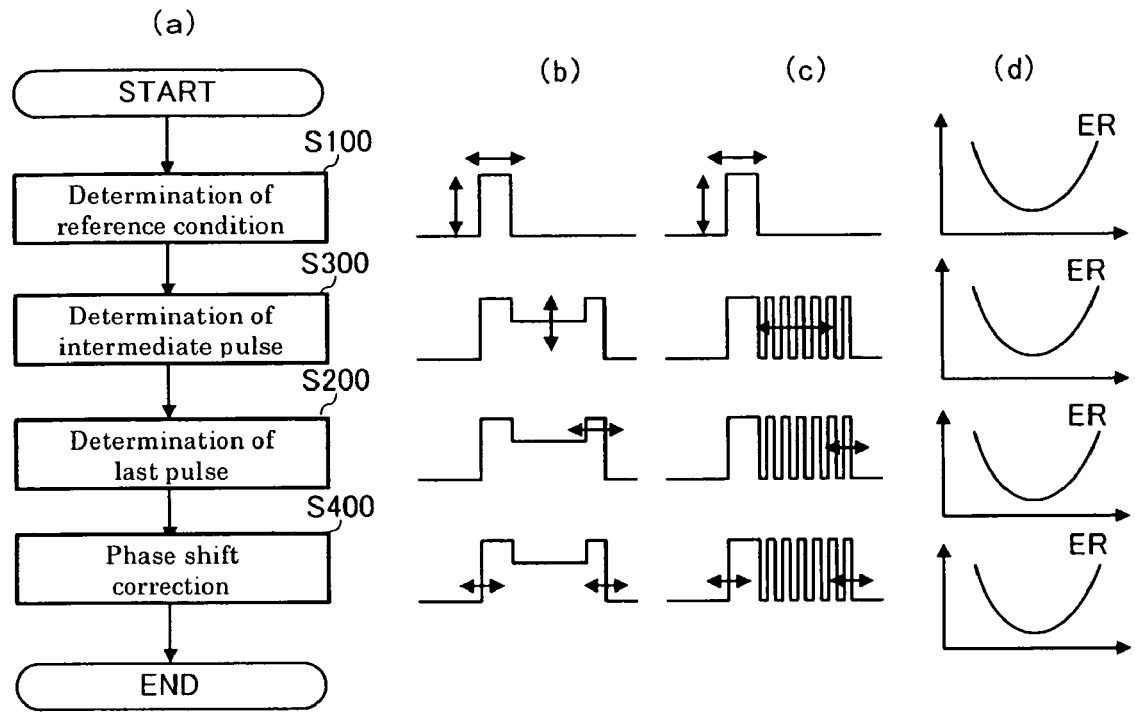
FIG. 3 is a schematic diagram showing a second method for determining a recording pulse condition.

FIG. 3 is a schematic diagram showing a second method for determining a recording pulse condition. FIG. 3(a) is a flowchart showing a determination procedure of the recording pulse condition, (b) illustrates a part to be adjusted for each step shown in the diagram (a) in a single pulse case, (c) illustrates a part to be adjusted for each step in (a) in a multipulse case, and (d) illustrates parameters to be used as indicators for each step in (a).

As shown in FIG. 3(a), to determine a recording pulse condition by this method, a reference condition for the recording pulse is determined first for each code (step S100). The reference condition can be configured by adjusting a power and a width of a top pulse to obtain a condition under which an error rate is minimized as shown in the step S100 of the diagram (b), (c), or (d).

Then, a test recording under the reference condition allows an intermediate pulse condition for recording to be determined (step S300). The intermediate pulse condition can be configured by adjusting an intermediate pulse power in a single pulse case or adjusting widths of divided pulses comprising the intermediate pulse in a multipulse case to obtain a condition under which an error rate is minimized as shown in the step S300 of the diagram (b), (c), or (d).

Subsequently, a test recording by the use of the reference condition obtained at the step S100 and the intermediate pulse obtained at the step S300 allows an last pulse condition for recording to be determined (step S200). The last pulse condition can be configured by adjusting a width of the last pulse while fixing the intermediate pulse under a predetermined condition to obtain a condition under which an error rate is minimized as shown in the step S200 of the diagram (b), (c), or (d).

Conducting the above steps S100 to S300 allows a recording pulse condition to be determined. Furthermore, a test recording using the determined recording pulse allows a phase shift of the recording pulse to be corrected (step S400). The phase shift can be corrected by adjusting a start position and an end position of the recording pulse to obtain a condition under which an error rate is minimized as shown in the step S400 of the diagram (b), (c), or (d).

Although in the above example, an error rate is used as an indicator at each step, any indicator may be used at each step; for example, an error rate may be used as an indicator for adjusting the reference condition, an asymmetry may be used as an indicator for adjusting the last pulse and the intermediate pulse, or the amplitude shift amount may be used for correcting a phase shift. Alternatively, a recording condition may be configured such that recording characteristics are most stabilized within a power margin that is determined using an error rate as an indicator.

Figure 4:
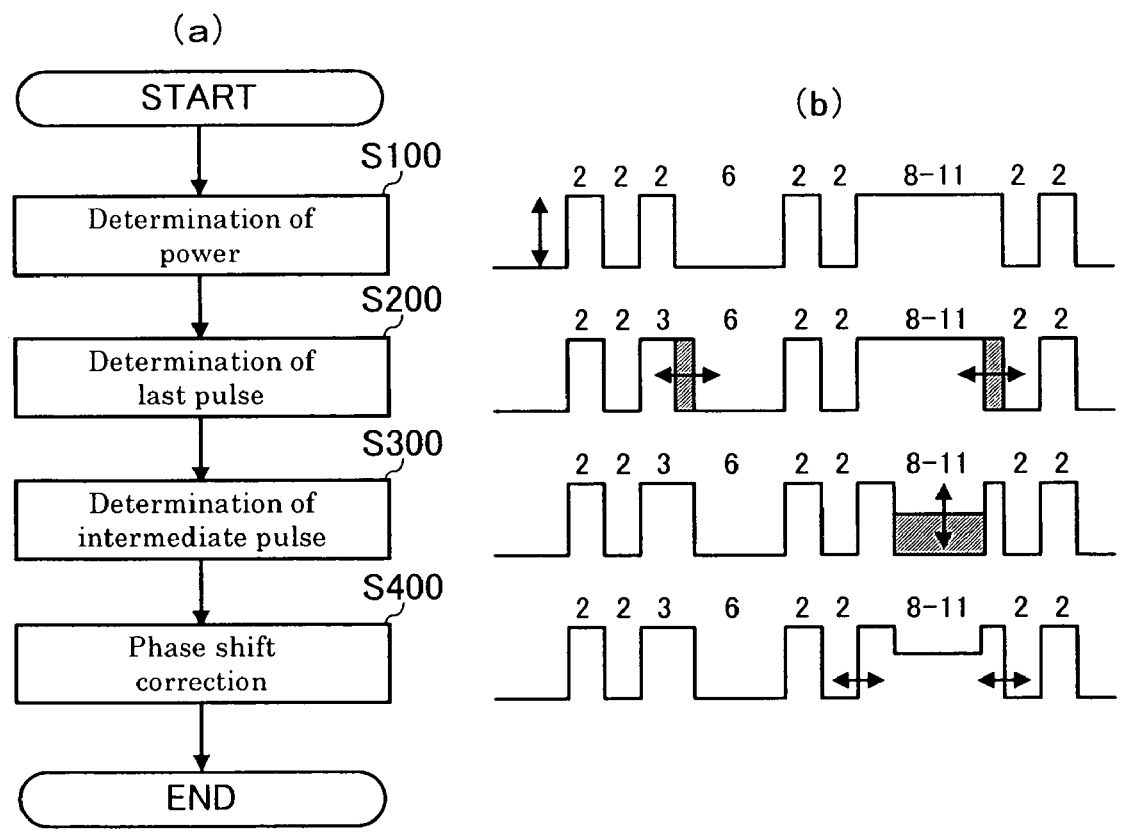
FIG. 4 is a schematic diagram showing a third method for determining a recording pulse condition.

FIG. 4 is a schematic diagram showing a third method for determining a recording pulse condition. The method shown in the diagram is an example of a method for determining a recording condition base on a result of a test recording, which is conducted using a recording pattern comprising multiple types of codes. FIG. 4(a) is a flowchart showing a determination procedure of the recording pulse condition, and (b) illustrates a part of a recording pattern comprised of single pulses to be adjusted for each step shown in the diagram (a). In addition, a numerical value in the diagram (b) represents a mark length or a space length corresponding to each code as a unit time length, and the representation of "8-11" means any code between 8T and 11T.

As shown in FIG. 4(a), to determine a recording pulse condition by this method, a power condition for a recording pattern comprised of multiple types of codes is determined first (step S100). The power condition can be configured by adjusting a power of the entire recording pattern as shown in the step S100 of the diagram (b). As an indicator for adjusting the power, a condition under which a shift amount for the amplitude value I2 of the shortest code 2T equals to zero may be used or a condition under which an error rate is minimized may be used. Alternatively, the power condition may be configured such that recording characteristics are most stabilized within a power margin that is determined using an error rate as an indicator.

The above recording pattern is preferably prepared in a drive, and as conditions for top, intermediate and last pulses to be used for the recording pattern, standard values stored in the drive may be used or the conditions may be obtained by a test recording.

Then, a test recording under the power condition obtained at the step S100 allows a last pulse condition for recording to be determined (step S200). The last pulse condition can be configured by adjusting a width of the last pulse while fixing the top and intermediate pulses under predetermined conditions as shown in the step S200 of the diagram (b).

In this example, a code having a length of 3T or longer uses a last pulse, and therefore the ends of pulses corresponding to a 3T mark and an 8-11T mark are adjusted at the step S200 in FIG. 4(b). As an indicator for the last pulse, a condition under which an asymmetry 2T3T representing an asymmetry property between the amplitude value I2 of the shortest code 2T and that I3 of the second shortest code 3T equals to zero may be used or a condition under which an error rate is minimized may be used.

Subsequently, a test recording by the use of the power condition obtained at the step S100 and the last pulse obtained at the step S200 allows an intermediate pulse condition for recording to be determined (step S300). The intermediate pulse condition can be configured by adjusting a power of the intermediate pulse as shown in the step S300 of the diagram (b).

In this example, a code having a length of 4T or longer uses an intermediate pulse, and therefore an intermediate pulse power of a pulse corresponding to an 8-11T mark is adjusted at the step S300 in FIG. 4(b). As an indicator for adjusting the intermediate pulse, a condition under which an asymmetry 2T11T representing an asymmetry property between the amplitude value I2 of the shortest code 2T and that I11 of the longest code 11T equals to zero may be used or a condition under which an error rate is minimized may be used.

Conducting the above steps S100 to S300 allows a condition for each recording pulse included in a recording pattern to be determined. Furthermore, a test recording using the determined recording pulses allows a phase shift of a recording pulse requiring a correction to be corrected (step S400). The phase shift can be corrected by adjusting a start position and an end position of the recording pulse to be corrected as shown in the step S400 of the diagram (b).

The recording pulse to be corrected is identified by test recordings with multiple types of recording patterns, and for example, in a pattern shown in FIG. 4(b), 8-11T corresponds to a code to be corrected. In addition, as an indicator for correcting the phase shift, an asymmetry value may be used or an error rate may be used.

FIG. 5 is a schematic diagram showing a fourth method for determining a recording pulse condition. The method shown in the diagram is an example of a method for determining a recording condition base on a result of a test recording, which is conducted using a recording pattern comprising multiple types of codes, similarly to FIG. 4. FIG. 5(a) is a flowchart showing a determination procedure of the recording pulse condition, and (b) illustrates a part of a recording pattern comprised of multipulses to be adjusted for each step shown in the diagram (a). In addition, a numerical value in the diagram (b) represents a mark length or a space length corresponding to each code as a unit time length, and the representation of "8-11" means any code between 8T and 11T.

As shown in FIG. 5(a), to determine a recording pulse condition by this method, a power condition for a recording pattern comprised of multiple types of codes is determined first (step S100). The power condition can be configured by adjusting a power of the entire recording pattern as shown in the step S100 of the diagram (b). As an indicator for adjusting the power, a condition under which a shift amount for the amplitude value I2 of the shortest code 2T equals to zero may be used or a condition under which an error rate is minimized may be used. Alternatively, the power condition may be configured such that recording characteristics are most stabilized within a power margin that is determined using an error rate as an indicator.

The above recording pattern is preferably prepared in a drive, and as conditions for top, intermediate and last pulses to be used for the recording pattern, standard values stored in the drive may be used or the conditions may be obtained by a test recording.

Then, a test recording under the power condition obtained at the step S100 allows a last pulse condition for recording to be determined (step S200). The last pulse condition can be configured by adjusting a width of the last pulse while fixing the top and intermediate pulses under predetermined conditions as shown in the step S200 of the diagram (b).

In this example, a code having a length of 3T or longer uses a last pulse, and therefore the ends of pulses corresponding to a 3T mark and an 8-11T mark are adjusted at the step S200 in FIG. 5(b). As an indicator for the last pulse, a condition under which an asymmetry 2T3T representing an asymmetry property between the amplitude value I2 of the shortest code 2T and that I3 of the second shortest code 3T equals to zero may be used or a condition under which an error rate is minimized may be used.

Subsequently, a test recording by the use of the power condition obtained at the step S100 and the last pulse obtained at the step S200 allows an intermediate pulse condition for recording to be determined (step S300). The intermediate pulse condition can be configured by adjusting widths of divided pulses comprising the intermediate pulse as shown in the step S300 of the diagram (b).

In this example, a code having a length of 4T or longer uses an intermediate pulse, and therefore widths of divided pulses comprising a pulse corresponding to an 8-11T mark are adjusted at the step S300 in FIG. 5(b). As an indicator for adjusting the intermediate pulse, a condition under which an asymmetry 2T11T representing an asymmetry property between the amplitude value I2 of the shortest code 2T and that I11 of the longest code 11T equals to zero may be used or a condition under which an error rate is minimized may be used.

Conducting the above steps S100 to S300 allows a condition for each recording pulse included in a recording pattern to be determined. Furthermore, a test recording using the determined recording pulses allows a phase shift of a recording pulse requiring a correction to be corrected (step S400). The phase shift can be corrected by adjusting a start position and an end position of the recording pulse to be corrected as shown in the step S400 of the diagram (b).

The recording pulse to be corrected is identified by test recordings with multiple types of recording patterns, and in a pattern shown in FIG. 5(b) for example, 8-11T corresponds to a code to be corrected. In addition, as an indicator for correcting the phase shift, an asymmetry value may be used or an error rate may be used.

FIG. 6 is a schematic diagram showing a fifth method for determining a recording pulse condition. The method shown in the diagram is an example of a method for determining a recording condition base on a result of a test recording, which is conducted using a recording pattern comprising multiple types of codes, similarly to the method shown in FIG. 4. FIG. 6(a) is a flowchart showing a determination procedure of the recording pulse condition, and (b) illustrates a part of a recording pattern comprised of single pulses to be adjusted for each step shown in the diagram (a). In addition, a numerical value in the diagram (b) represents a mark length or a space length corresponding to each code as a unit time length, and the representation of "8-11" means any code between 8T and 11T.

As shown in FIG. 6(a), to determine a recording pulse condition by this method, a top pulse condition for a recording pattern comprised of multiple types of codes is determined first (step S100). The top pulse condition can be configured by adjusting a power and a width of a top pulse corresponding to each of the codes comprising the recording pattern as shown in the step S100 of the diagram (b). As an indicator for adjusting the top pulse, a condition under which a shift amount for the amplitude value I2 of the shortest code 2T equals to zero may be used or a condition under which an error rate is minimized may be used. The other conditions are the same as in the case shown in FIG. 4.

Effects of each of the above-described methods were examined on a HD-DVD recording system and the results were as follows: Firstly, it was verified that as only a last pulse was varied stepwise, an asymmetry value 2T3T was varied approximately linearly with respect to a width of the last pulse. At the same time, PRSNR and SbER values representing recording characteristics were measured and it was also verified from the measurement results that the both values exhibited a good recording margin for the asymmetry value 2T3T.

Secondly, it was verified that as only an intermediate pulse was varied stepwise, an asymmetry value 2T11T was varied approximately linearly with respect to a width of the intermediate pulse. At the same time, PRSNR and SbER values representing recording characteristics were measured and it was also verified from the measurement results that the both values exhibited a good recording margin for the asymmetry value 2T11T.

Furthermore, it was verified that when an intermediate pulse was determined so as to zero an asymmetry value 2T11T after determining a last pulse so as to zero an asymmetry value 2T3T, an asymmetry value 3T11T was also reduced to zero while keeping the asymmetry value 2T3T at the value which had been obtained by adjusting the last pulse.

Figure 7:
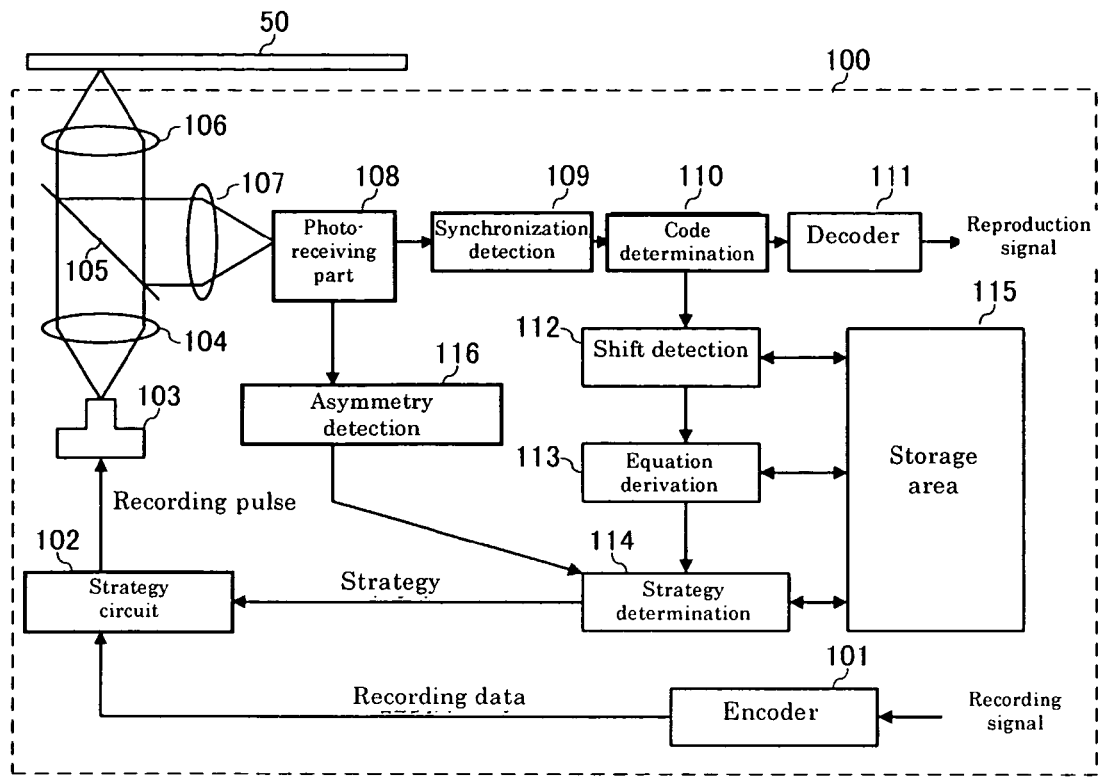
FIG. 7 is a block diagram illustrating the internal configuration of a drive according to an embodiment of the present invention.

FIG. 7 is a block diagram illustrating an internal configuration of a drive of one embodiment. As shown in the diagram, the drive 100 records/reproduces information onto/from a medium 50 using a laser beam emitted from a laser oscillator 103.

When recording information onto the medium 50, a recording signal corresponding to the information desired to be recorded is encoded by an encoder 101 using an EFM method, and the obtained encoded data are transmitted to a strategy circuit 102.

The strategy circuit 102 is configured with various setting parameters for a certain strategy, and correcting the various parameters for the strategy to control the intensity and pulse width of a laser beam emitted from the laser oscillator 103 generates in the strategy circuit 102 a recording pulse with which a desired recording state may be obtained.

The recording pulse generated in the strategy circuit 102 is transmitted to the laser oscillator 103, where an output laser beam is controlled according to the recording pulse, and the controlled laser beam is irradiated via a lens 104, a half mirror 105, and a lens 106 to the medium 50 that is rotating at a constant linear velocity or at a constant rotational speed. Consequently, a recording pattern comprised of a mark/space stream corresponding to the desired recording data is recorded onto a recording layer of the medium 50.

In contrast, when reproducing the information recorded on the medium 50, a homogeneous reproduction laser beam emitted from the laser oscillator 103 is irradiated via the lens 104, half mirror 105, and lens 106 to the medium 50 that is rotating at a constant linear velocity or at a constant rotational speed.

The reproduction laser beam has lower intensity than the recording laser beam emitted from the oscillator 103 upon recording, and the reflected light of the reproduction laser beam from the medium 50 is received at a photo-receiving part 108 via the lens 106, the half mirror 105, and a lens 107 and then transformed into an electrical signal.

The electrical signal output from the photo-receiving part 108 corresponds to the recording pattern comprised of the marks and spaces recorded on the medium 50. A synchronizing signal detection circuit 109 generates a clock signal with a certain cycle based on a wobble component included in the electrical signal output from the photo-receiving part 108. Subsequently, the electrical signal is encoded in a code determination circuit 110, decoded in a decoder 111, and output as a reproduction signal. A configuration for determining a recording condition will be described later.

As described, because recording quality of a recording system comprised of a drive and a medium depends on the variation between optical information recording devices and on the variation between optical information recording media, absorbing such dependency with the strategy enables the recording quality to be improved. In addition, various media including dye type media represented by CD-R or DVD-R, and phase-change media represented by CD-RW or DVD-RW may be applied to the medium.

The determination flow for a recording pulse condition as shown in FIG. 2 (a), which is conducted by the above-described drive, is hereinafter described in detail.

Determination of Reference Condition

Figure 8:
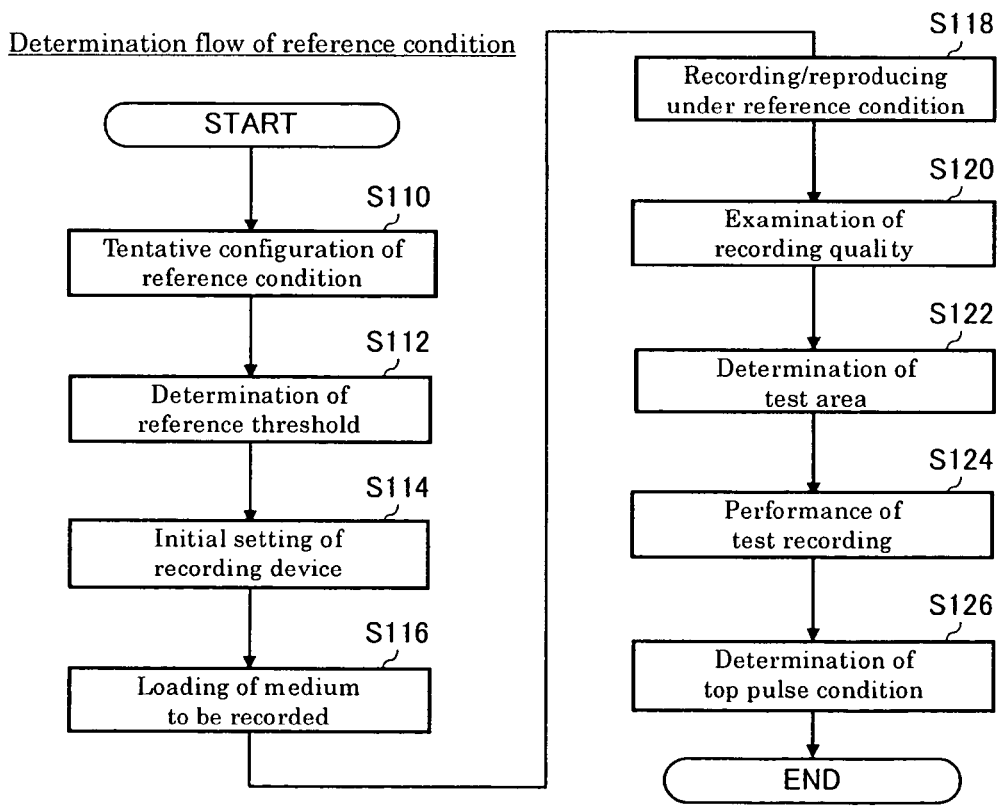
FIG. 8 is a flowchart showing a detailed execution procedure of a reference condition determination step shown in FIG. 2(a).

FIG. 8 is a flowchart showing a detailed execution procedure of the determination step of a reference condition shown in FIG. 2(a). As shown in FIG. 8, the drive 100 conducts steps S110 to S114 to configure an initial setting, steps S116 to S122 to determine a test recording condition, a step S124 to conduct a test recording under the determined condition, and a step S126 to determine a top pulse condition based on a result of the test recording. The details of each step are described below.

Tentative Determination of Reference Condition

In the step S110 in FIG. 8, a test recording onto any typical medium is conducted while varying a recording speed, whereby one pulse width and three power values are obtained as a reference condition. For the three power values, based on a result of the test recording, a power value corresponding to a minimum error rate and two other power values before and after the power value are preferably used. For the two other power values, it is preferable to use values around a threshold that provides a criterion for determining whether or not the error rate is acceptable. The reference condition obtained in this step is later used for the verification of recording quality.

Determination of Criterial Threshold

As described later in detail, in order to define a region meeting a predetermined recording margin as a range of a test recording condition (hereinafter referred to as a "test area"), a criterial threshold should be determined. As the threshold value, a standard value for each drive or medium type may be prepared; however, the threshold that indicates a minimum limit of an acceptable error rate is varied depending on optical components comprising the pickup shown in FIG. 8 or on the other elements as well as on a recording speed for a medium.

Accordingly, it is recommended to set up a more accurate test area by obtaining such threshold for each combination of a drive and a medium to provide a more accurate criterion.

However, because setting the threshold for each combination of a drive and a medium causes the number of recording steps to be increased, the threshold suitable for each drive may be stored in a storage area 115 during manufacturing of drives, assuming that the variation between drives is a main cause of the variation of the threshold.

FIG. 9 is a flowchart showing the details of a determination step for a threshold shown in FIG. 8. As shown in FIG. 9, the threshold is determined in such a way that recording/reproducing under a predetermined recording condition is conducted, then a preliminary threshold based on the recording/reproducing result is determined, and the value ensuring a certain margin to the preliminary threshold is set as a threshold used for determining a test area. Hereinafter, each step is sequentially described.

Firstly, a step S150 for determining a recording condition is conducted. At this step, certain patterns of conditions necessary for recording/reproducing including a pulse width, power, recording/reproduction speed, and recording address are prepared. After those recording conditions are configured in a drive, a reference medium is loaded into the drive. As the reference medium, it is preferable to select one having typical characteristics from various media.

Secondly, by conducting a recording/reproducing step S152 onto/from the reference medium loaded under the recording conditions configured by the above-described step S150, recording/reproduction characteristic values for each of the recording conditions, such as error rates, jitter values, amplitudes, or C/N values are obtained. At this step, a value indicating recording quality is selected as the characteristic value. An example in which a jitter value is used as an indicator for the recording quality is described below.

Subsequently, a system reference value is determined by conducting a step S154, wherein an optimum value, such as a minimum jitter value, is selected from the recording/reproducing characteristic values obtained in the above-described step S152. Consequently, a jitter value considered to be closer to an optimum value for the drive is set as a reference value. In addition, instead of the optimum jitter value, a mean of two values at which a predetermined threshold intersects with an approximated curve for the jitter values, that is, a mean value of a power margin may be used as the reference value.

Finally, a step S156 wherein a threshold is calculated by multiplying the system reference value obtained in the above-described step S154 by a predetermined coefficient $\alpha$ (preferably $\alpha > 1$), is conducted. This enables the determination under the condition where the system reference value has the predetermined margin. Specifically, the calculation of the threshold is conducted by multiplying the system reference value by $\alpha$, where the coefficient $\alpha$ preferably be a value around 1.5. In addition, the coefficient $\alpha$ may be a suitable value corresponding to a type of drive or medium, for example, a value approximate to the system reference value such as $\alpha = 0.8$ to 1.2 or a larger value such as $\alpha = 2.0$ to 3.0 is applicable.

FIG. 10 is a schematic diagram showing an example of the flow shown in FIG. 9. The example shown in FIG. 10 exemplifies a case where reproduction characteristics 202-1 to 202-4 are obtained respectively by applying power P1 to P6 to each pulse width W1 to W4 while using a jitter value as a characteristic value that indicates recording quality. In the example, a pulse width W1 to W4 and power P1 to P6 are set as the recording conditions, and an extremal value of the recording characteristic 102-3 that exhibits a minimum jitter value is set as the system reference value. The threshold may be obtained by multiplying the system reference value by, for example, 1.5. In addition, the arrows in the matrix table of the diagram indicate the direction of changing a test condition and are hereinafter used as the same meaning.

FIG. 11 is a schematic diagram showing an example of the flow shown in FIG. 9. The example shown in FIG. 11 illustrates a case where reproduction characteristics 202-1 to 202-4 are obtained by applying power P1 to P6 to each pulse width W1 to W4 while using a jitter value as a characteristic value that indicates recording quality. In the example, an extremal value of the reproduction characteristic 202-2 that exhibits a minimum jitter value is the system reference value. The threshold may be obtained by multiplying the system reference value by, for example, 1.5. As described, a threshold can be determined for each pulse width by changing a power condition.

FIG. 12 is a schematic diagram showing an example of a case wherein a threshold is calculated for each drive. If setting a threshold correspondingly to the variation of the drive is desired, as shown in the diagram, a common reference medium 50 is recorded/reproduced in each of the drives 100-1 to 100-5, and thresholds 1 to 5 unique to the respective drives are stored.

In addition, when simplified procedure for setting a threshold is desired, an average of thresholds 1 to 5, which are obtained by recording/reproducing a common reference medium with several typical derives, is calculated, and the average threshold may be used as a threshold for other drives.

The drives used for obtaining the average threshold described above may have an identical or similar design. Further, the average threshold can be used for those drives as a threshold. In addition, an obtained average threshold can be used as a general threshold for drives having an identical or similar design to be manufactured. Also, multiple drives having variations each other are meaningfully prepared, and then an average of thresholds obtained for the drives may be used as the average threshold.

Initial Setting of Recording Device

In a storing step S114, the reference condition and reference threshold obtained in the steps S110 and S112 of FIG. 8 respectively are stored in the recording area 115 of the drive 100. This step S114 is preferably conducted during manufacturing of the drive 100.

Load of Medium for Recording

Subsequently, a step S116 is conducted to load a medium 50, onto which information is to be recorded, into the drive 100 wherein the initial setting is completed in the step S114.

Recording/Reproduction Using Reference Condition

Next, a step S118 is conducted to record information onto the medium 50 loaded in the step S116 under the condition set in the step S114. Specifically, three jitter values are obtained by recording/reproducing the medium with one pulse width defined as the reference condition and at three different power values. By plotting those three jitter values against the power, the tendency of recording characteristics corresponding to the combination of the drive 100 and the medium 50 becomes apparent.

Examination of Recording Quality

FIG. 13 is a schematic diagram showing an example wherein a concave pattern is obtained as a result of examining recording quality at the step S120 in FIG. 8. As shown in FIG. 13, the examination of the recording quality is conducted using jitter values and thresholds for each of the reference conditions obtained in the above-described steps. The diagram exemplifies a case wherein power values P1, P2, and P3 are used respectively as the reference conditions, and a virtual line connecting the jitter values obtained at each power value forms a concave pattern. Such a concave pattern means that the reference medium used in the step S110 and the medium for recording loaded in the step S116 have the same sensitivity and similar recording qualities.

FIG. 13(a) shows an example wherein the minimum value of the concave pattern is equal to or less than the threshold, and FIG. 13(b) an example wherein the minimum value of the concave pattern is more than the threshold. In either pattern, the reference medium and the medium for recording are considered to have the same sensitivity. In such a case where the reference medium and the medium for recording have the same sensitivity, as described below, a condition to be used for a test recording is configured in a plane region of (power)×(pulse width) centering on the reference condition.

In comparison between FIGS. 13(a) and (b), the difference between the reproduction value and the reproduction reference value obtained at each of the recording points P1, P2, and P3, i.e., the difference between the jitter value and the jitter threshold is varied, and the obtained reproduction value in FIG. 13(a) is closer to the reproduction reference value than that in the diagram (b).

This suggests that the detection of an optimum condition is easier in the case of FIG. 13(a) than in the case of FIG. 13(b). Accordingly, when the recording characteristic shown in FIG. 13(a) is obtained, compared to the case of FIG. 13(b), a smaller number of testings can be set, and the configuration allows more suitable solution to be found with a smaller number of testings.

That is, an optimum condition is closer to the reference value when the difference between the reproduction value and the reproduction reference value is smaller, whereas an optimum condition is further from the reference value when the difference between the reproduction value and the reproduction reference value is larger. Thus, when a smaller number of testings is desired, it is preferable to change the number of testings depending on the difference between the reproduction value and the reproduction reference value.

FIG. 14 is a schematic diagram showing an example wherein a downward-sloping pattern is obtained as a result of examining recording quality at the step S120 in FIG. 8. In the example shown in FIG. 14, a downward-sloping pattern wherein the jitter value decreases as the power increases from P1 to P3 is obtained. Such a downward-sloping pattern means that the medium for recording has lower sensitivity than the reference medium.

FIG. 14(a) shows an example wherein the minimum value of the downward-sloping pattern is equal to or less than the threshold, and FIG. 14(b) an example wherein the minimum value of the downward-sloping pattern is more than the threshold. In either pattern, the medium for recording is considered to have lower sensitivity than the reference medium. In such a case where the medium for recording has lower sensitivity than the reference medium, as described below, a test recording is conducted under the condition of shifting the test area, which is defined by a plane region of (power)×(pulse width) centering on a reference condition, in the direction of a region with a higher power and a wider pulse width.

Also, when a downward-sloping pattern as shown in FIG. 14 is obtained, an additional recording at a power higher than P3 enables to reconfirm the recording characteristic because the minimum jitter value is considered to be present on the higher-power side. In such a case, although the number of testings is increased by 1, accuracy in examining the recording quality can be improved. In addition, in the case that a downward-sloping pattern is obtained, just as in the case of concave pattern, the number of testings may be changed depending on the difference between the reproduction value and the reproduction reference value.

Further, when a downward-sloping pattern as shown in FIG. 14 is obtained, an optimum solution is considered to be further from the reference condition than in the case of concave pattern in FIG. 13. Consequently, it is preferable to set a larger number of testings in the case of FIG. 14 compared to the concave pattern.

Figure 15:
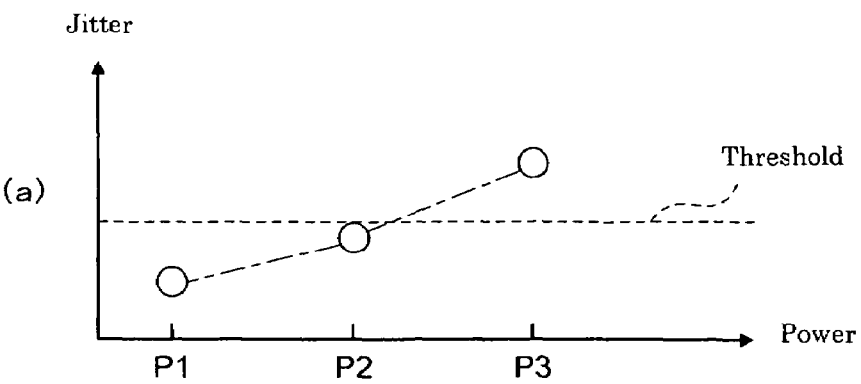
FIG. 15 is a schematic diagram showing an example wherein an upward-sloping pattern is obtained as a result of examining recording quality in the step S120 in FIG. 8.

FIG. 15 is a schematic diagram showing an example wherein an upward-sloping pattern is obtained as a result of examining recording quality in the step S120 in FIG. 8. In the example in FIG. 15, an upward-sloping pattern wherein a jitter value increases as a power increases from P1 to P3 is obtained. Such an upward-sloping pattern means that the medium for recording has higher sensitivity than the reference medium.

FIG. 15(a) shows an example wherein the minimum value of the upward-sloping pattern is equal to or less than the threshold, and FIG. 15(b) an example wherein the minimum value of the upward-sloping pattern is more than the threshold. In either pattern, the medium for recording is considered to have higher sensitivity than the reference medium. In such a case where the medium for recording has higher sensitivity than the reference medium, as described below, a test recording is conducted under the condition of shifting the test area, which is defined by a plane region of (power)×(pulse width) centering on a reference condition, in the direction of a region with a lower power and a narrower pulse width.

Also, when an upward-sloping pattern as shown in FIG. 15 is obtained, because the minimum jitter value is considered to be present on the lower-power side, the recording characteristic can be reconfirmed by an additional recording at a power lower than P1. In such a case, although the number of testings is increased by 1, accuracy in examining the recording quality can be improved. In addition, in the case that a downward-sloping pattern is obtained, just as in the case of concave pattern, the number of testings may be changed depending on the difference between the reproduction value and the reproduction reference value.

Further, when an upward-sloping pattern as shown in FIG. 15 is obtained, an optimum solution is considered to be further from the reference condition than the case of concave pattern shown in FIG. 13. Consequently, it is preferable to set a larger number of testings in the case of FIG. 15 compared to the concave pattern.

Determination of Test Area

Figure 16:
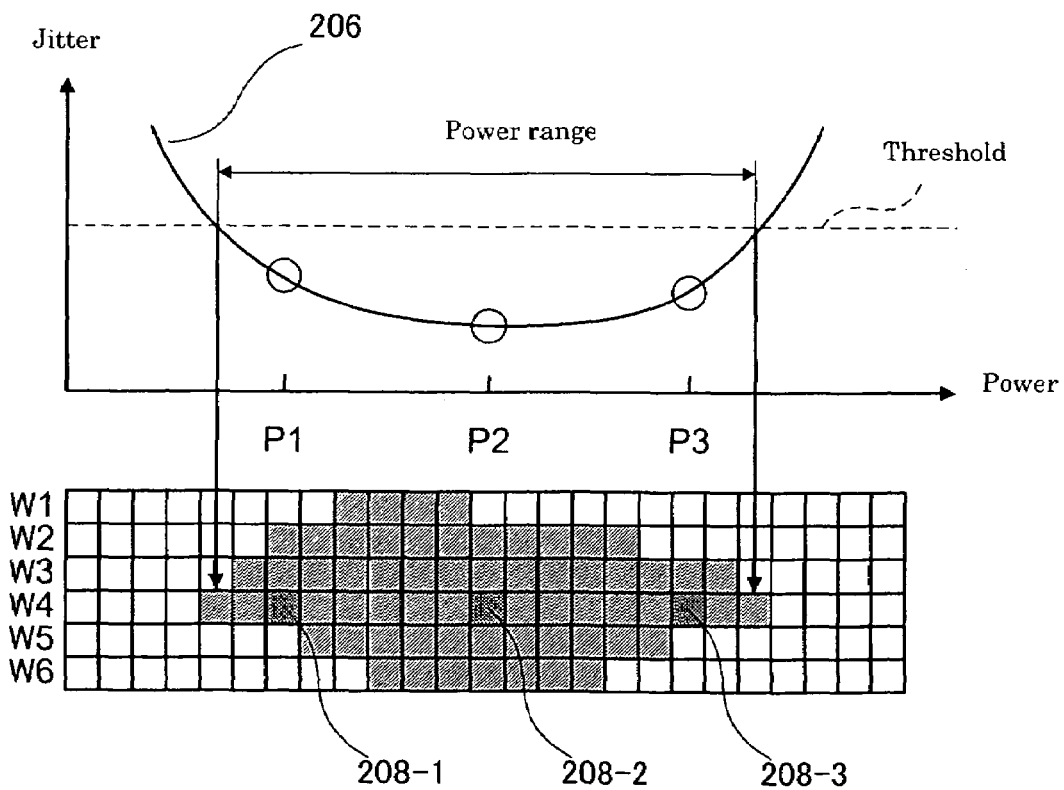
FIG. 16 is a schematic diagram showing an example of determining a test area as conducted in the step S122 for the case wherein a concave pattern is obtained in the step S120 in FIG. 8.

FIG. 16 is a schematic diagram showing an example of determining a test area as conducted in the step S122 for the case wherein a concave pattern is obtained in the step S120 in FIG. 8. As shown in FIG. 16, when a concave pattern is obtained, the power range between two intersections of an approximated curve 206, which represents jitter values obtained at P1 to P3 respectively, and a threshold is defined as a range of changing power used for a test recording. Note that, in one embodiment, a range of power used for an actual test recording is defined as a "power range," and a range of power with which the jitter value becomes equal to or less than threshold is defined as a "power margin."

Because the approximated curve 206 varies for each pulse width, recording is conducted for each pulse width at power values of P1 to P3, and the intersections of the resulting approximated curve 206 for jitter values with the threshold are obtained. For example, if the pulse width used as the reference condition is W4, recording is conducted for each of the pulse widths W1 to W6 centering on W4 to find the intersections. As shown in the matrix image of the diagram, the power range that is equal to or less than the threshold is obtained for each of the pulse widths, resulting in the test area indicated by the hatched area of the image. In the image, 208-1, 208-2, and 208-3 show the cases wherein the recording is conducted respectively at three power values of P1 to P3, which are used as the reference conditions, for the pulse width W4. The determined test area is defined as a plane region of (power)×(pulse width) centering on the reference condition.

As described, because the area where the jitter value is equal to or less than the threshold is intensively tested to enable to find the power range for each of the pulse widths, more suitable condition can be found with a smaller number of testings.

Also, the number of testings can be reduced by setting larger steps for power variation when a wider power margin is obtained, or by setting smaller steps for power variation when a narrower power margin is obtained. For example, when a margin of 10 mW is obtained, testings with 2 mW step may be run five times assuming that an optimum value can be obtained even by rough testings, and when a margin of 1 mW is obtained, testings with 1 mW step may be run ten times considering that more precise testings are required.

FIG. 17 is a schematic diagram showing an example of determining a test area as conducted in the step S122 for the case wherein a downward-sloping pattern is obtained in the step S120 in FIG. 8. As shown in FIG. 17, when a downward-sloping pattern is obtained, an optimum condition is considered to be present on a higher-power side. Accordingly, additional recording is conducted with a power value of P+ (>P3), and a range between two intersections of an approximated curve 206, which represents jitter values obtained at P1 to P3 and P+ respectively, with a threshold is defined as a power range. By conducting this procedure for each pulse width W1 to W6, the test area shown by the matrix image of the diagram is obtained.

The test area determined by the above-described procedure is just as a plane region of (power)×(pulse width) centering on a reference condition 208-1, 208-2, and 208-3 shifted to a higher-power side. The pulse widths W1 to W6 used in the case of the concave pattern are also used in this example, but because the medium for recording tends to have lower sensitivity in the downward-sloping pattern, a power range may be shifted to a region with a wider pulse width.

FIG. 18 is a schematic diagram showing an example of determining a test area as conducted in the step S122 for the case wherein an upward-sloping pattern is obtained at the step S120 in FIG. 8. As shown in FIG. 18, when an upward-sloping pattern is obtained, an optimum condition is considered to be present on a lower-power side. Accordingly, additional recording is conducted with a power value of P+ (<P1), and a range between two intersections of an approximated curve 206, which represents jitter values obtained at P+ and P1 to P3 respectively, with a threshold is defined as a power range. By conducting this procedure for each pulse width W1 to W6, the test area shown by the matrix image of the diagram is obtained.

The test area determined by the above-described procedure is just as a plane region of (power)×(pulse width) centering on a reference condition 208-1, 208-2, and 208-3 shifted to a lower-power side. The pulse widths W1 to W6 used in the case of the concave pattern are also used in this example, but because the medium for recording tends to have higher sensitivity in the upward-sloping pattern, the power range may be shifted to a region with a narrower pulse width.

Because the above-described method involves examining recording quality for each pulse width and determining the number of testings for each pulse width based on the examination result, reduction in the number of testings can be expected. The examination of recording quality described hereinabove is an example wherein the jitter variation during recording under the reference condition is patterned, and more preferably, it is recommended that the following eight patterns be used.

FIG. 19 is a diagram showing an example wherein the step S120 in FIG. 8 is conducted with eight patterns. As shown in FIG. 19, a pattern 1 is applied to any patterns including the concave, upward-sloping, and downward-sloping patterns when the maximum jitter value is equal to or less than a threshold. When this pattern is obtained, the medium for recording is considered to have comparable sensitivity to the reference medium as well as a wider margin in which jitter values are equal to or less than the threshold can be obtained, and therefore the power condition is extended to both lower- and higher-power sides. In other words, an additional recording is conducted on both lower- and higher-power sides in the pattern 1 because values approximate to the threshold are not obtained.

Subsequently, a curve approximation is conducted to the jitter characteristics obtained as a result of the above-described additional recording, and the interval between the large and small values at which the approximated curve intersects with the jitter threshold is set as a reference power range.

Further, when the pattern 1 is obtained, the pulse width area with a reference value ±0.2T is defined as a test area, and upon test recording, an optimum recording condition is detected while varying the pulse width within the test area by 0.2T at one time. In addition, T represents a unit time of a recording mark.

Assuming that a pulse width to be a reference value is a pulse condition 1 and the two extended points are pulse conditions 2 and 3 respectively, the pulse conditions 2 and 3 of the pattern 1 are the pulse widths obtained by extending the pulse condition 1 by ±0.2T. Along with this variation in the pulse width condition, the power range used as a test condition should be slightly modified.

That is, when the pulse width is varied by 0.1T, the power range for the pulse width is set as (the reference power range)×(1−0.05×1) mW, and when the pulse width is varied by 0.2T, the power range for the pulse width is set as (the reference power range)×(1−0.05×2) mW. Further, when the pulse width is varied by −0.1T, the power range for the pulse width is set as (the reference power range)×(1−0.05×(−1)) mW.

Accordingly, the test conditions for the case of the pattern 1 are comprised of the following three sets.
 (1) A reference pulse width and a reference power range
 (2) A reference pulse width−0.2T and (a reference power range)×(1−0.05×(−2)) mW
 (3) A reference pulse width+0.2T and (a reference power range)×(1−0.05×(+2)) mW In one embodiment, the reference condition provided in the above (1) is not necessarily used for an actual test recording.

A pattern 2 is the case in which a concave pattern is obtained, and is applied when the minimum jitter value is equal to or less than the threshold. When this pattern is obtained, the medium for recording is considered to have the same sensitivity as the reference medium, and therefore (a reference value ±0.1T) is selected as a pulse width condition. Subsequently, a power range is defined for each pulse condition by the same procedure as in the pattern 1 case. Consequently, the test conditions for the case of the pattern 2 are comprised of the following three sets.
  (1) A reference pulse width and a reference power range
  (2) A reference pulse width−0.1T and (a reference power range)×(1−0.05×(−1)) mW
  (3) A reference pulse width+0.1T and (a reference power range)×(1−0.05×(+1)) mW A pattern 3 is the case in which a concave pattern is obtained, and is applied when the minimum jitter value is more than the threshold. When this pattern is obtained, the medium for recording is considered to have the same sensitivity as the reference medium and there is a large difference between media, and therefore (a reference value±0.2T) is selected as a pulse width condition, followed by defining a power range for each pulse condition by the same procedure as in the case of pattern 1. Consequently, the test conditions for the case of pattern 3 are comprised of the following three sets.
  (1) A reference pulse width and a reference power range
  (2) A reference pulse width−0.2T and (a reference power range)×(1−0.05×(−2)) mW
  (3) A reference pulse width+0.2T and (a reference power range)×(1−0.05×(+2)) mW A pattern 4 is the case in which a downward-sloping pattern is obtained, and is applied when the minimum jitter value is equal to or less than the threshold. When this pattern is obtained, the medium for recording is considered to have slightly lower sensitivity than the reference medium, and therefore three pulse width conditions: a reference value, +0.1T, and +0.2T, are selected. Subsequently, a power range for each pulse condition is defined by the same procedure as in the case of pattern 1. Consequently, the test conditions for the case of pattern 4 are comprised of the following three sets.
  (1) A reference pulse width and a reference power range
  (2) A reference pulse width+0.1T and (a reference power range)×(1−0.05×(+1)) mW
  (3) A reference pulse width+0.2T and (a reference power range)×(1−0.05×(+2)) mW A pattern 5 is the case in which a downward-sloping pattern is obtained, and it is applied when the minimum jitter value is more than the threshold. When this pattern is obtained, the medium for recording is considered to have significantly lower sensitivity than the reference medium, and therefore three pulse width conditions: a reference value, +0.2T, and +0.4T, are selected. Subsequently, a power range for each pulse condition is defined by the same procedure as in the case pattern 1. Consequently, the test conditions for the case of pattern 5 are comprised of the following three sets.
  (1) A reference pulse width and a reference power range
  (2) A reference pulse width+0.2T and (a reference power range)×(1−0.05×(+2)) mW
  (3) A reference pulse width+0.4T and (a reference power range)×(1−0.05×(+4)) mW A pattern 6 is the case in which an upward-sloping pattern is obtained, and is applied when the minimum jitter value is equal to or less than the threshold. When this pattern is obtained, the medium for recording is considered to have slightly higher sensitivity than the reference medium, and therefore three pulse width conditions: a reference value, −0.1T, and −0.2T, are selected. Subsequently, a power range for each pulse condition is defined by the same procedure as in the case of pattern 1. Consequently, the test conditions for the case of pattern 6 are comprised of the following three sets.
  (1) A reference pulse width and a reference power range
  (2) A reference pulse width−0.1T and (a reference power range)×(1−0.05×(−1)) mW
  (3) A reference pulse width−0.2T and (a reference power range)×(1−0.05×(−2)) mW A pattern 7 is the case in which an upward-sloping pattern is obtained, and is applied when the minimum jitter value is more than the threshold. When this pattern is obtained, the medium for recording is considered to have significantly higher sensitivity than the reference medium, and therefore three pulse width conditions: a reference value, −0.2T, and −0.4T, are selected. Subsequently, a power range for each pulse condition is defined by the same procedure as in the case of pattern 1. Consequently, the test conditions for the case of pattern 7 are comprised of the following three sets.
  (1) A reference pulse width and a reference power range
  (2) A reference pulse width−0.2T and (a reference power range)×(1−0.05×(−2)) mW
  (3) A reference pulse width−0.4T and (a reference power range)×(1−0.05×(−4)) mW A pattern 8 is the case in which a convex pattern is obtained, and is applied when the minimum jitter is more than the threshold. When this pattern is obtained, it is considered as an error pattern and (a reference value ±0.2T) is selected as a pulse width condition. Subsequently, a power range for each pulse condition is defined by the same procedure as in the case of pattern 1. Consequently, the test conditions for the case of pattern 8 are comprised of the following three sets.
  (1) A reference pulse width and a reference power range
  (2) A reference pulse width−0.2T and (a reference power range)×(1−0.05×(−2)) mW
  (3) A reference pulse width+0.2T and (a reference power range)×(1−0.05×(+2)) mW In addition, when any pattern other than the pattern 2 that is closest to the reference medium is detected among the above-described 8 patterns, the jitter may be further detected by again reproducing the recording result, from which the pattern is obtained, in order to confirm that the pattern is not due to a reproduction error. When a characteristic other than the pattern 2 is again obtained by the additional reproduction, the recording condition may be added or extended according to the conditions shown in FIG. 19.

When the pattern 8 is obtained as a result of checking the reproduction error as described above, recording is conducted again with the reference pulse width before conducting an additional recording and a pulse width extension because a recording error may exist. When the pattern 8 is again obtained as a result of reproducing the recording, an extension of a pulse condition, i.e., the extension of the pulse conditions 2 and 3 is conducted instead of conducting an additional recording, i.e., a power extension to measure the margin for the pulse condition 1. A power extension corresponding to the extension of the pulse conditions 2 and 3 can be conducted by the aforementioned procedure.

That is, when pattern 8 is obtained, a reference power range for the extension cannot be determined because a margin cannot be ensured with the pulse condition 1. Accordingly, the initial power condition range is set as a reference power range.

Determination of Test Area: Determination of Power Range by Approximation Method Further to the above-described procedure that enables to determine the test area in which an optimum solution can be obtained by the smallest possible number of testings, the determination method of a power range, which is important for the determination of the test area, should be described below.

Because it is one object of the present invention to improve the accuracy of finding the optimum solution with the smallest possible number of testings, the test conditions are concentrated in the area equal to or less than the threshold as described above. Based on the idea, a power range used for a test recording may be obtained from larger and smaller power values that indicate a margin for a threshold. The "margin for a threshold" means a range where a characteristic value equal to or less than the threshold can be obtained, and "larger and smaller power values" means two values on lower- and higher-power sides respectively that define a range of the margin.

Considering the time reduction in test recording for each type of media and the efficient use of a test area in a medium such as write-once medium having a limited test recording area, the smallest possible number of recording points is preferably required. However, because a power range obtained in this procedure is an important parameter to be a criterion of an optimum recording condition, the highest possible accuracy is much more required rather than the smallest possible number of testings.

Obtaining a more accurate power range means more intensive testings in the selected area, and accordingly contributes to the reduction of the number of testings. For example, when conducting a test recording once for every 0.1 mW, the test recording is conducted 10 times for the power range of 1 mW and 20 times for the power range of 2 mW, and thus, narrowing the power range can contribute to the reduction of the number of testings.

In consideration of recording quality of the recording/reproduction signal that shows a variation like a quadratic curve having an extremal value as an optimum point against the variation in recording power, one embodiment proposes a method in which a desired margin amount is obtained by approximating a characteristic curve using several recording points. Such approximating method enables a power range to be obtained precisely and easily with several recording points and the number of testings to be reduced.

FIG. 20 is a schematic diagram showing a method for obtaining the power range used at the step S122 in FIG. 8 by curve approximation. As shown in FIG. 20, an approximation is conducted by first selecting points a, b, and c, wherein the points a and c are on a lower- and higher-power sides respectively, at which the jitter values criterial for recording characteristic are in a vicinity of a threshold, and the point b is located between the points a and b, at which the jitter value is smaller than that at the point a, point b, or the threshold. Accordingly, the relation between the points a, b, and c is expressed as below.

$a>b, c>b$, and threshold$>b$

As shown in FIG. 20, the "vicinity of a threshold" is defined as a range between upper and lower limits that are away from the threshold by certain amount. Preferably, the upper limit value is set to be 40% more than the threshold, and the lower value to be 5% less than the threshold. Subsequently, the values at the points a, b, and c are approximated with a quadratic function, and the difference between larger and smaller points, at which the quadratic function and the threshold intersects, is defined as a power range. In addition, a range defined as the vicinity of a threshold can be modified in consideration of the interval between recording points, such as −5% to +40% or −10% to +30%.

Figure 21:
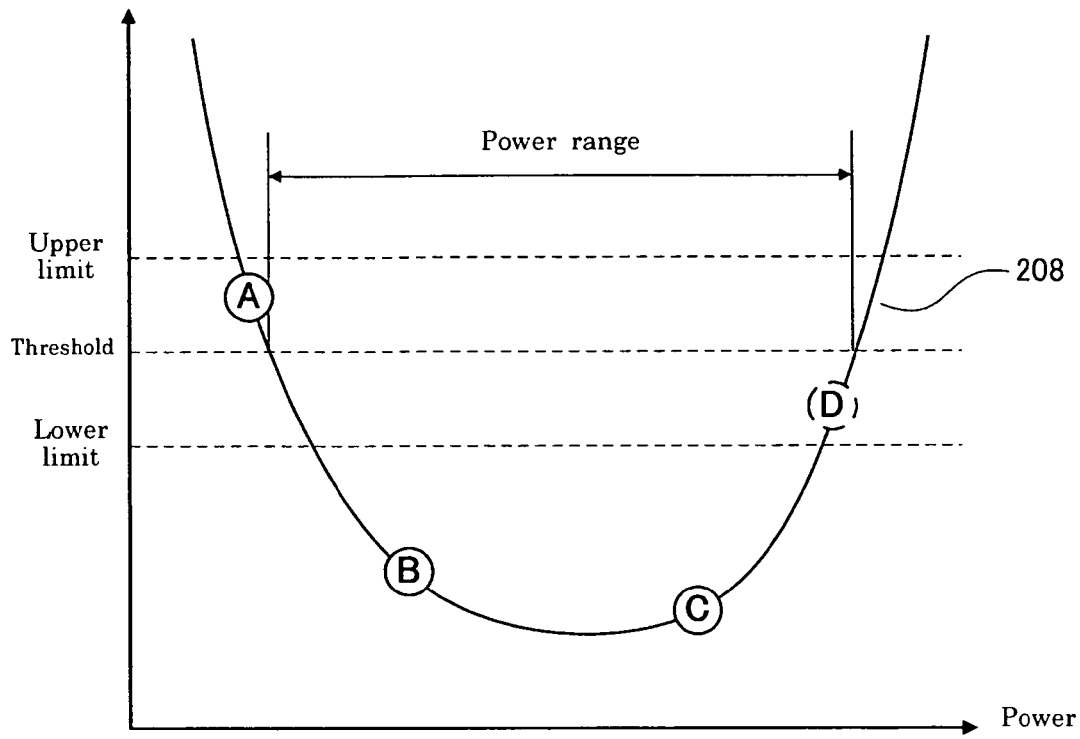
FIG. 21 is a schematic diagram showing another example of the method for obtaining a power range to be used for step S122 in FIG. 8 by curve approximation.

FIG. 21 is a schematic diagram showing another example of a method for obtaining a power range used at the step S122 in FIG. 8 by curve approximation. As shown in FIG. 21, when the conditions of A, B, and C are not sufficient to satisfy the above-described relationship of "a$>$b, c$>$b, and threshold$>$b," it is preferable to obtain another value in the vicinity of the threshold by adding a point D on the higher-power side.

Further, when the relationship of B$>$C exists as shown in the diagram, it is preferable to obtain an approximation expression with the three points A, C, and D without the use of B.

Because the relationship between the three recording points and the threshold is "A$>$C, D$>$C, and threshold$>$C" that is suitable for drawing an approximation curve, a highly accurate approximated curve can be obtained by using the three points. In addition, an additional recording condition for the point D may be determined according to the relationship of the recording points A, B, and C prior to the additional recording, i.e., A$>$B and B$>$C, and a threshold.

Also, contrary to FIG. 20, recording can be conducted under a power condition lower than at the point A when a value in the vicinity of a threshold does not exist on a lower-power side. Depending on the relation between recording points and a threshold, one or more recording conditions may be added.

In addition, a power range used for the additional recording condition may have a constant variation to a predetermined power step, or a power condition may be set after preliminary obtaining the relation between a jitter variation and a power variation.

In case that appropriate recording points for finding a power range are not obtained even by adding a recording condition as described above, recording points may be changed by further adding a recording condition with the aforementioned procedure.

In case of a medium with a limited test recording area such as a write-once medium, or in case of avoiding a significant amount of testing time, the number of the above-described additional recording conditions may have an upper limit. Also, a recording power may have an upper limit in order to prevent the recording power from exceeding a specified maximum laser output due to the additional recording conditions.

Further, a power range is obtained by the three-point approximation in the above-described example, but it may also be determined in such a way that two points closest to a threshold are first selected, and then the difference between the two power values corresponding respectively to those two points are obtained.

Another method of selecting two points in the vicinity of a threshold may be configured, wherein recording is repeated with power variations until larger and smaller points that are respectively located on higher and lower sides of the threshold are obtained, and two points that are closest to the threshold among all the recorded points or two points that are located on either side of the threshold are selected. The detail of the method is described below.

Determination of Test Area: Determination of Power Range by Sampling

Figure 22:
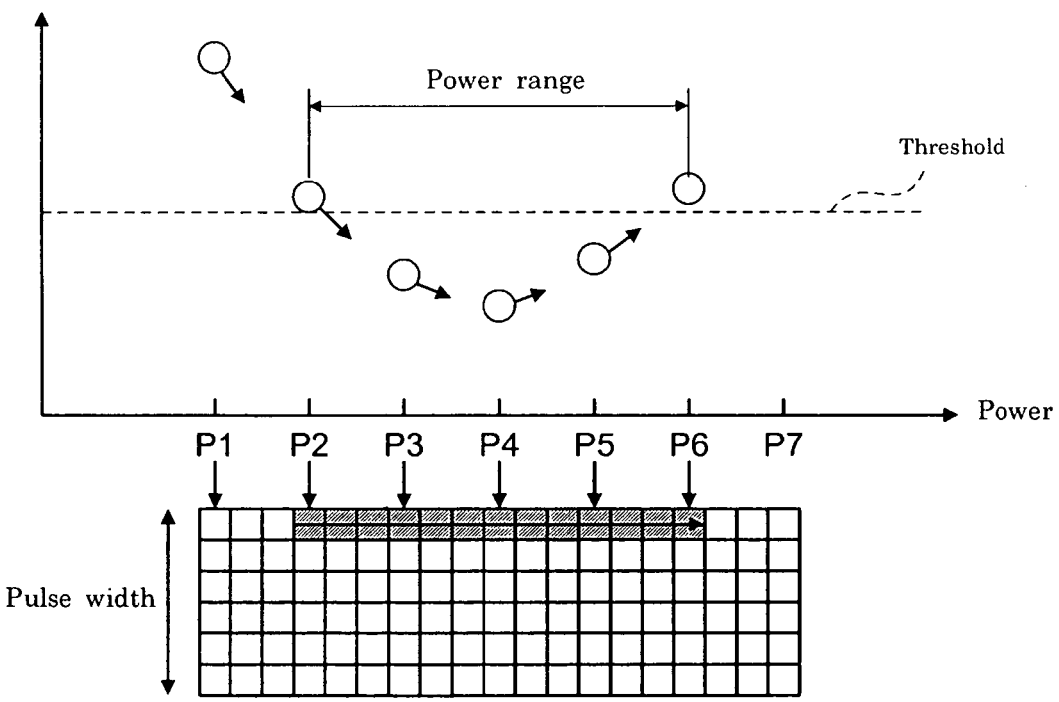
FIG. 22 is a schematic diagram showing an example of obtaining a power range to be used for the step S122 in FIG. 8 by sampling.

FIG. 22 is a schematic diagram showing an example of obtaining a power range used at the step S122 in FIG. 8 by sampling. As shown in FIG. 22, instead of approximating the three points as described above, a power range is obtained on the basis of larger and smaller power values that are close to a threshold and obtained by gradually varying a power.

Specifically, as shown in FIG. 22, recording/reproduction is repeated while varying the recording power from P1 to P2, P3, . . . up to a power P6 at which a value more than the threshold is obtained. A matrix image of this step shows that the power is varied from P1 to P6, but the power range is between P2 on the lower-power side and P6 on the higher-power side that are both closest to the threshold. In this way, a power range may be determined by selecting two points respectively located on either side of a threshold.

A method of selecting the two points, higher and lower, closest to a threshold involves selecting to use one of the following as appropriate.
 (1) A method of selecting higher and lower points that define a power margin, that is, selecting two points that are in a power area, wherein a reproduction reference value is satisfied, and both closest to a reproduction reference value.
 (2) Selecting two points closest to a reproduction reference value that are slightly outside of a power margin.
 (3) Selecting two points that are on either side of a reproduction reference value on a lower-power side.
 (4) Selecting two points that are on either side of a reproduction reference value on a higher-power side.
 (5) Selecting two points that are on either side of a reproduction reference value on the lower- and higher-power sides respectively and which are both close to a reproduction reference value.

Also, approximating recording characteristics using two points selected by one of the above-described methods allows two points at which the approximated curve intersects with a reproduction reference value to be selected. The above steps allow a top pulse condition to be determined as a reference of a recording pulse condition.

Determination of Last Pulse

Figure 23:
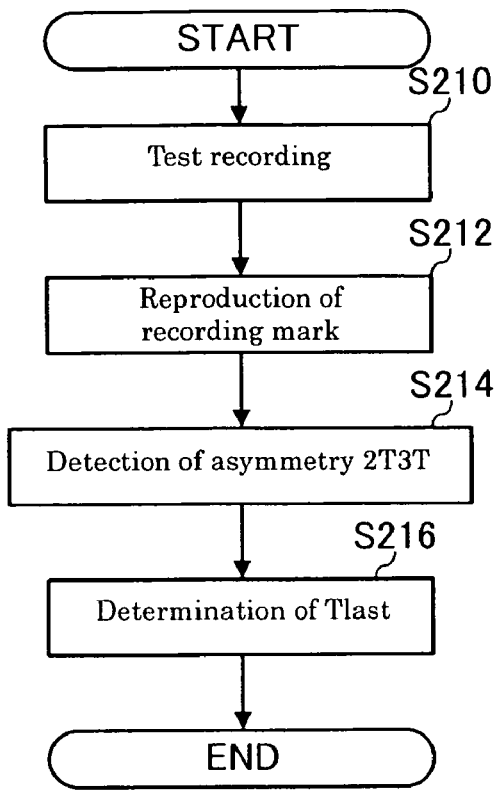
FIG. 23 is a flowchart showing a detailed execution procedure of a last pulse condition determination step shown in FIG. 2(a).

FIG. 23 is a flowchart showing a detailed execution procedure of the determination step for a last pulse condition shown in FIG. 2(a). As shown in FIG. 23, to determine the last pulse condition, a test recording is first conducted using a top pulse condition determined by the aforementioned procedure and an intermediate pulse condition tentatively configured (step S210), then recording marks formed as a result of the test recording are reproduced (step S212), and an asymmetry value 2T3T is detected (step S214). Subsequently, a pulse width at which the asymmetry value 2T3T equals to zero is identified and the pulse width is set as the last pulse condition (step S216).

Figure 24:
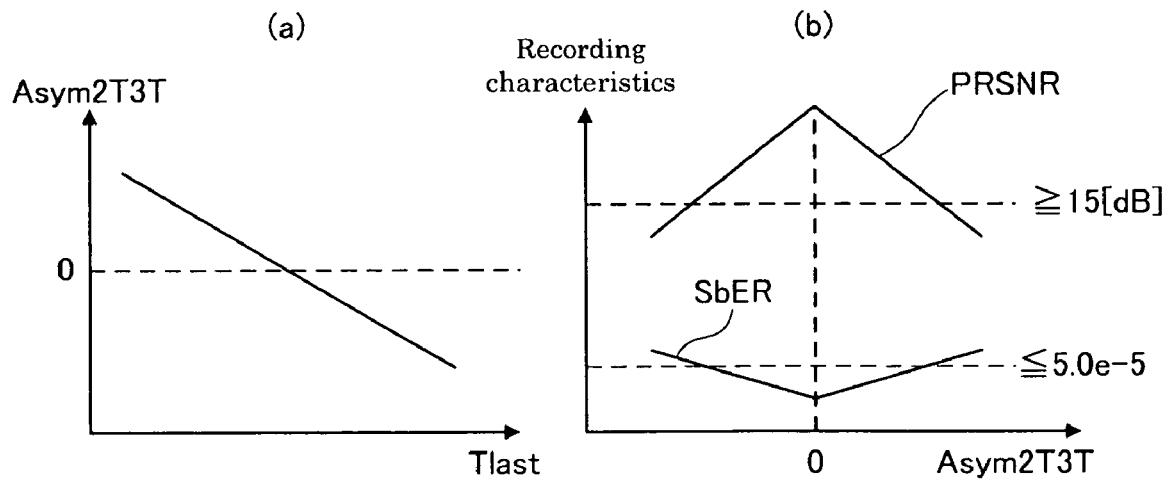
FIG. 24 is a graph illustrating a result of executing the procedure shown in FIG. 23.

FIG. 24 shows graphs illustrating the results of conducting the procedure shown in FIG. 23. FIG. 24(a) shows asymmetry values 2T3T obtained while varying a last pulse width Tlast stepwise, wherein a width at which an asymmetry value equals to zero is set as a last pulse condition. FIG. 24(b) shows asymmetry 2T3T dependent recording characteristics, wherein both recording characteristics, PRSNR and SbER, exhibit best values at an asymmetry value 2T3T of zero. Because PRSNR is preferably 15 dB or larger and SbER is preferably 5.0e-5 or less, the recording condition under which an asymmetry 2T3T equals to zero results in satisfactory recording characteristics.

Determination of Intermediate Pulse

Figure 25:
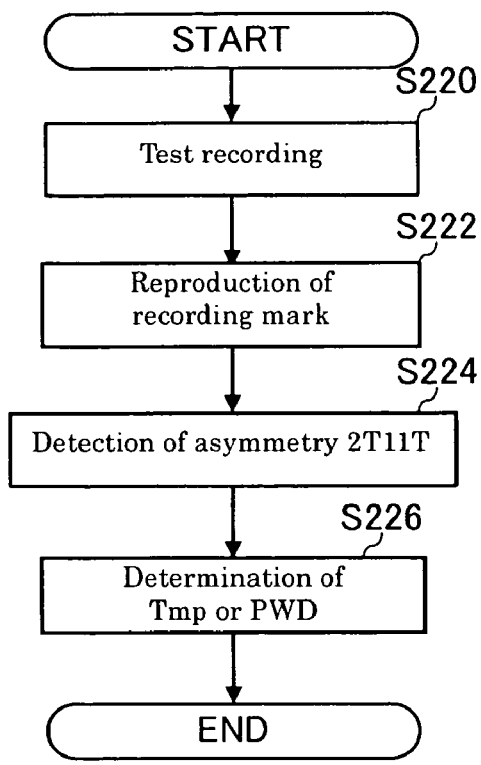
FIG. 25 is a flowchart showing a detailed execution procedure of an intermediate pulse condition determination step shown in FIG. 2(a).

FIG. 25 is a flowchart showing a detailed execution procedure of the determination step for an intermediate pulse condition shown in FIG. 2(a). As shown in FIG. 25, to determine the intermediate pulse condition, a test recording is first conducted using the top pulse and last pulse conditions determined by the aforementioned procedure (step S220), then recording marks formed as a result of the test recording are reproduced (step S222), and an asymmetry value 2T11T is detected (step S224). Subsequently, a pulse width at which the asymmetry value 2T11T equals to zero is identified and the pulse width is set as the intermediate pulse condition (step S226).

Figure 26:
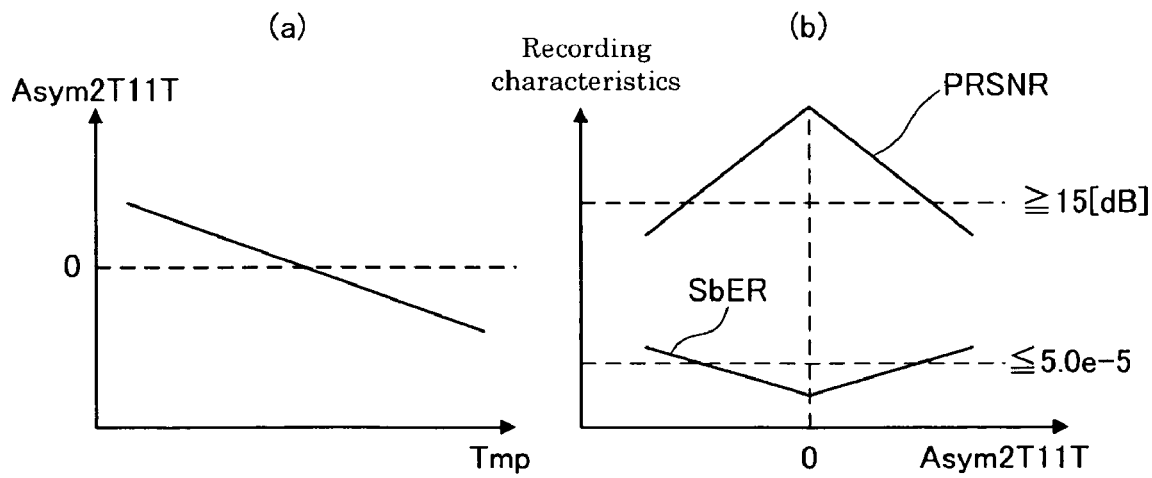
FIG. 26 is a graph illustrating a result of executing the procedure shown in FIG. 25.

FIG. 26 shows graphs illustrating the results of conducting the procedure shown in FIG. 25. FIG. 26(a) shows asymmetry values 2T11T obtained while varying an intermediate pulse width Tmp stepwise, wherein a width at which an asymmetry value equals to zero is set as an intermediate pulse condition. FIG. 26(b) shows asymmetry 2T11T dependent recording characteristics, wherein both recording characteristics, PRSNR and SbER, exhibit best values at an asymmetry value 2T11T of zero. Because PRSNR is preferably 15 dB or larger and SbER is preferably 5.0e-5 or less, the recording condition under which an asymmetry 2T11T equals to zero results in satisfactory recording characteristics.

As described above, adjusting a last pulse results in the coincidence between center levels of 2T and 3T signal amplitudes, and also adjusting an intermediate pulse results in the coincidence between center levels of 2T and 11T signal amplitudes. Accordingly, center levels of 3T and 11T signal amplitudes obviously coincide with each other. Consequently, three asymmetry indicators, i.e., asymmetries 2T3T, 2T11T, and 3T11T, coincide almost at an asymmetry value of zero. This condition best stabilizes recording characteristics. In addition, the adjustment of the intermediate pulse is preferably carried out by controlling a ratio between the top pulse and intermediate pulse powers in the single pulse case or by controlling an intermediate pulse width in the multipulse case.

Phase Shift Correction

A phase shift correction is carried out in such a way that a test recording of a predetermined pattern is first conducted using a recording pulse for each code determined at the above-described steps, then a mark/space string formed as a result of the test recording is reproduced, and a shift correction is made for obtained code information. In the following description, 3T is used as the shortest code; however, the description may be applied to the case where 2T is used as the shortest code.

Figure 27:
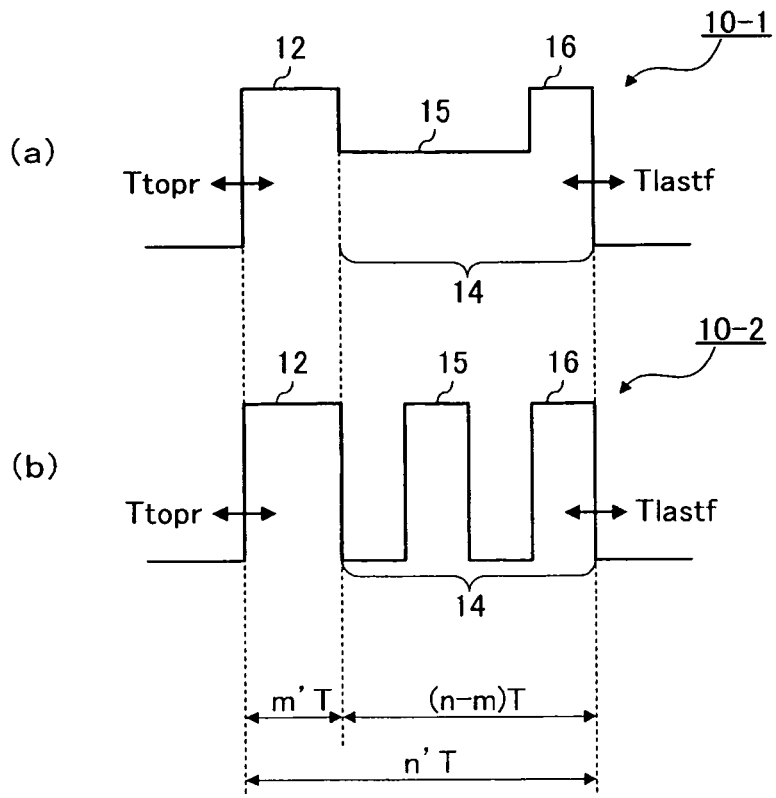
FIG. 27 is a schematic diagram showing an example of a test recording pulse that is used for a phase shift correction shown in FIG. 2(a).

FIG. 27 is a schematic diagram showing an example of a test recording pulse that is used for a phase shift correction shown in FIG. 2(a). FIG. 27(a) is an example of the case using a single pulse comprised of a single pulse pattern, and (b) the case using a multipulse comprised of a plurality of pulse patterns.

As shown in FIG. 27, in either case of the single pulse 10-1 or the multipulse 10-2, Ttopr that adjusts the start position of a top pulse 12 and Tlastf that adjusts the end position of a last pulse 16 are set as phase conditions for a recording pulse. Adjusting these values allows a mark length after recording to be further optimized. In addition, these phase conditions are determined by a test recording based on the top pulse condition and succeeding pulse condition determined by the above-described procedure.

Figure 28:
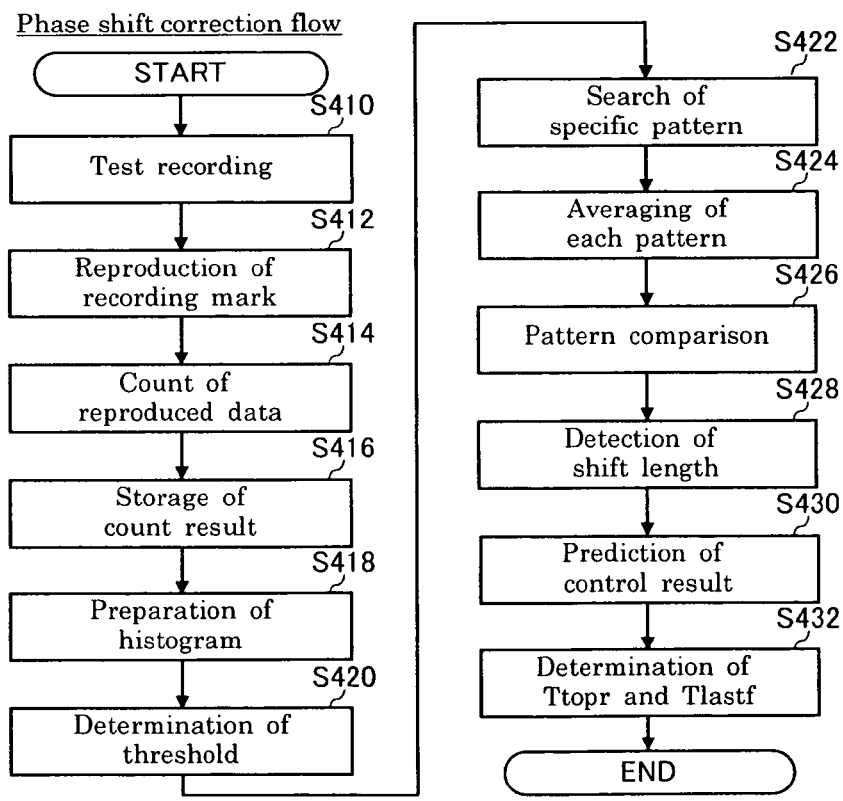
FIG. 28 is a flow chart showing an execution procedure of the phase shift correction shown in FIG. 2(a).

FIG. 28 is a flowchart showing an execution procedure of a determination flow of a phase shift correction shown in FIG. 2(a). As shown in FIG. 28, the drive shown in FIG. 7 conducts a test recording onto the medium 50 using various recording patterns obtained by varying the phase condition of a recording pulse comprised of a top pulse and a succeeding pulse (step S410). In this step, a top pulse condition and a succeeding pulse condition are fixed at the values obtained by the above-described procedure. Then, after a recording pattern formed by the test recording is reproduced (step S412), the recording shift detection part 112 counts the binarized reproduction signal obtained through a binarization circuit provided in the code determination circuit 110 using a counter synchronized with a predetermined clock (step S414), and lengths of marks and spaces included in the binarized reproduction signal are stored in the recording area 115 as count data respectively (step S416).

Then, the recording shift detection part 112 generates a histogram showing an appearance rate of each of the count values using the count data stored in the recording area 115 (step S418), and a threshold for the count data that provides a criterion for a mark or space length is determined (step S420).

Subsequently, the recording shift detection part 112 searches various types of specific patterns including a specific mark/space pattern from the count data stored in the recording area 115 on the basis of the threshold (step S422), and average lengths of respective marks and respective spaces comprising the specific patterns are calculated by averaging count results for the marks considered to have the same mark length included in the specific patterns as well as by averaging count results for the spaces considered to have the same space length (step S424).

After that, the recording shift detection part 112 sets one of the extracted specific patterns to a reference pattern, and comparing the reference pattern with other patterns (step S426) allows the following shift lengths to be detected independently (step S428).

(1) Front-side phase shift length of a mark relative to the recording pulse
(2) Back-side phase shift length of a mark relative to the recording pulse
(3) Shift length of a mark relative to the recording pulse due to heat interference Then, an equation derivation part 113 derives an equation for determining an optimum strategy based on the shift length detected by the recording shift detection part 112. A strategy determination part 114 predicts a control result of various parameters using an equation derived by the equation derivation part 113 (step S430), and then Ttopr and Tlastf shown in FIG. 27 are determined according to the prediction and set for the strategy circuit 102 (step S432).

Figures 29, 30:
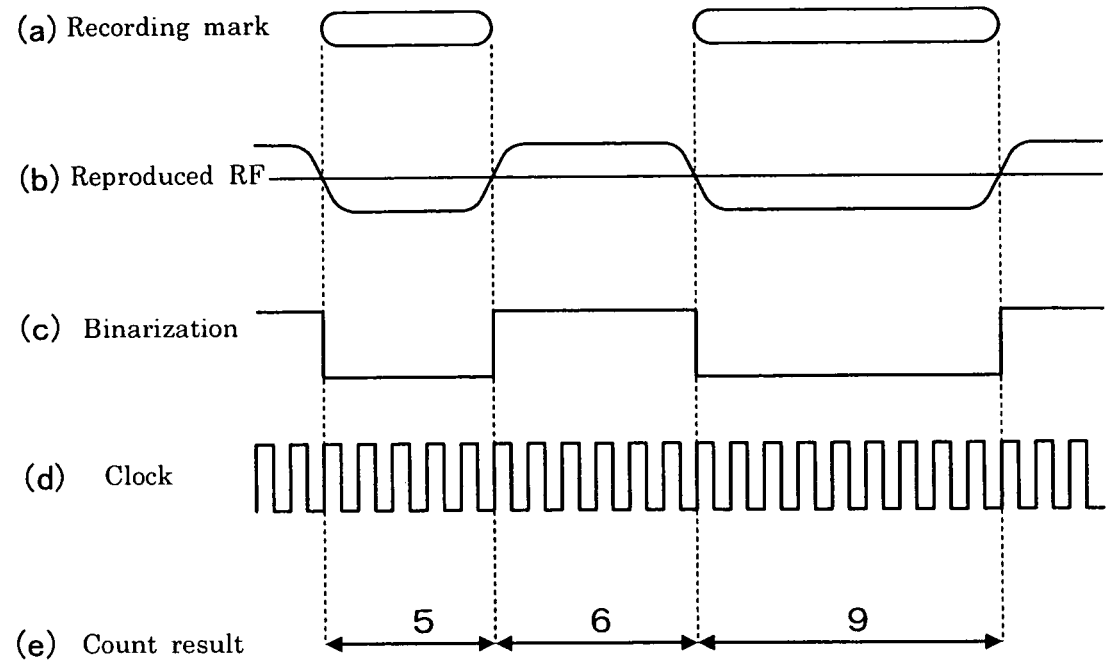
FIG. 29 is a schematic diagram showing an operation concept from the test recording step to the step of counting reproduction data shown in FIG. 28.
FIG. 30 is a schematic diagram showing an image of storing count results shown in FIG. 28.

FIG. 29 is a schematic diagram showing an operation concept from the step of test recording to the step of counting reproduction data shown in FIG. 28. As shown in FIG. 29, a test recording forms recording marks as shown in FIG. 29(a) onto an optical disk. Then, when the recording marks are reproduced, as shown in FIG. 29(b), a reproduction RF signal corresponding to the recording marks is obtained. By binarizing the reproduction RF signal, a binarized reproduction signal shown in FIG. 29(c) is obtained, and by counting a length of each pulse having either polarity shown in the binarized signal with a clock signal as shown in FIG. 29(d), count results shown in FIG. 29(e) is obtained.

FIG. 30 is a schematic diagram showing an image of storing the count results shown in FIG. 28. As shown in FIG. 30, the count result for each pulse having either polarity obtained by counting the binarized signal using the clock signal is stored in a table provided in the storage area 115 in time-series order.

Figure 31:
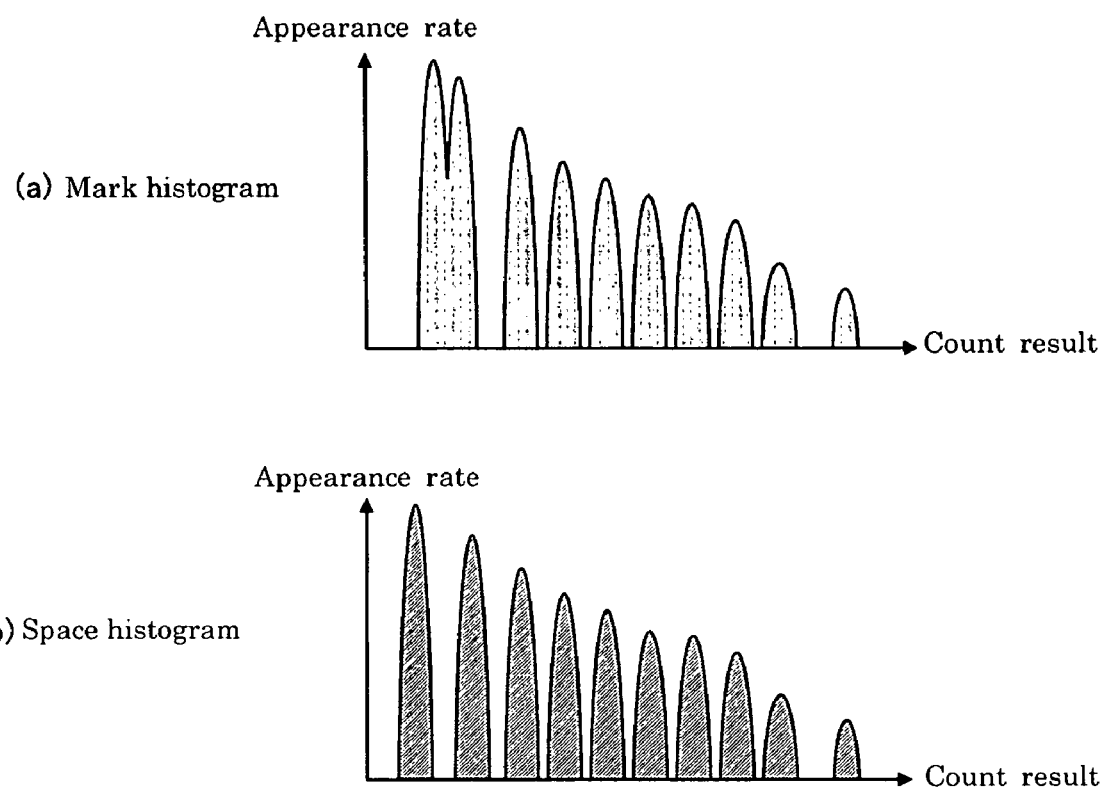
FIG. 31 is a schematic diagram showing an image of creating a histogram shown in FIG. 28.

FIG. 31 is a schematic diagram showing an image of creating a histogram shown in FIG. 28. As shown in FIG. 31, a histogram is obtained by graphing appearance rates for the respective count values, and by creating separate histograms for marks and spaces respectively, two different types of histograms, that is, a mark histogram showing a count tendency of marks (FIG. 31(a)) and a space histogram showing that of spaces (FIG. 31(b)) can be obtained. Thus, because each unit length nT (n=3, 4, 5, . . . 14) based on the reference clock is inevitably determined in optical disks, peaks showing the distribution of appearance rates for respective unit lengths nT are obtained.

Figure 32:
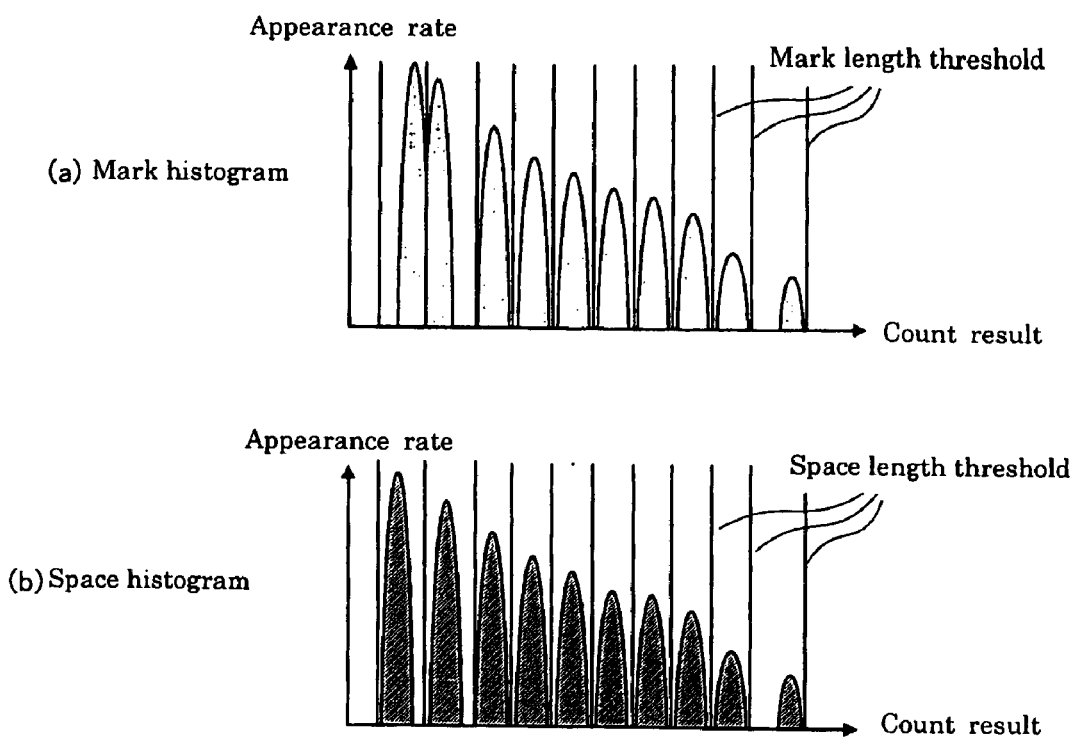
FIG. 32 is a schematic diagram showing an image of determining a threshold shown in FIG. 28.

FIG. 32 is a schematic diagram showing an image of determination of a threshold shown in FIG. 28. As shown in FIG. 32, because each valley portion formed between two adjacent peaks in each of the histograms can be used as a criterial threshold for each of unit lengths nT, a mark length threshold that provides a criterion for each of mark lengths and a space threshold that provides a criterion for each of space lengths are defined regarding the mark histogram and space histogram respectively.

Figures 33, 34:
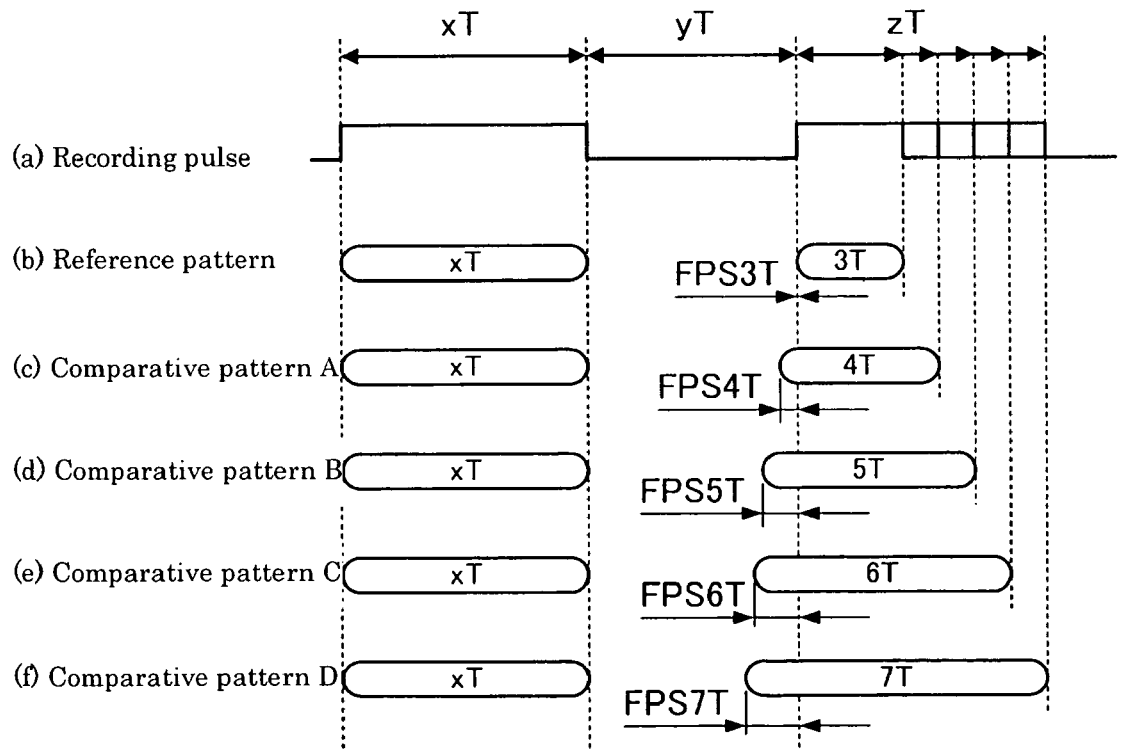
FIG. 33 is a schematic diagram showing an example of thresholds obtained by the method shown in FIG. 32.
FIG. 34 is a schematic diagram showing an example of a recording pattern and a reproduction pattern that are used for detecting a front-side phase shift length of each mark.

FIG. 33 is a schematic diagram showing an example of thresholds obtained by the method shown in FIG. 32. Each mark length threshold is defined for each boundary between two adjacent mark lengths as shown in FIG. 33(a), and each space length threshold for each boundary between two adjacent space lengths as shown in FIG. 33(b). The example in FIG. 33(a) shows that a threshold provided at a boundary between 2T and 3T is "count value=2", between 3T and 4T is "count value=9", and a threshold is set up to the boundary between 14T and 15T. The example in FIG. 33(b) shows that a threshold provided at a boundary between 2T and 3T is "count value=2" and between 3T and 4 T is "count value=10". Likewise, a threshold is set up to the boundary between 14T and 15T.

Next, each of the steps, from the step of searching a specific pattern (step S422) to the step of detecting a shift length (step S428), shown in FIG. 28 is described below in details. The steps are conducted in the recording shift detecting part 112, based on the principle for detecting various types of shifts.

FIG. 34 is a schematic diagram showing an example of a recording pattern and reproduction pattern that are used for detecting a front-side phase shift length of each mark. As shown in FIG. 34, in the case of detecting a front-side phase shift length of each mark, a test recording is conducted using a recording pulse shown in FIG. 34(a). The recording pulse includes a pattern having a fixed mark MxT, a fixed space SyT, and a variable mark MzT successively and is generated by, while fixing the lengths of the fixed mark MxT and the fixed space SyT, varying the mark length of the variable mark MzT from 3T, 4T, . . . 7T as shown in FIGS. 34(b) to (f). Although not shown in the diagram, the length of the variable mark MzT is varied up to 14T.

When the length of each fixed space SyT in the recording pattern is measured, the length of the fixed space SyT should be constant under an ideal recording condition. However, if the length of the fixed space SyT is shifted from the predetermined ideal length, because the lengths of the mark MxT is fixed, the shift length of each fixed space SyT from the predetermined ideal length corresponds to the front-side phase shift length of each mark, M3T, M4T, . . . or M14T, for each unit length 3T, 4T, . . . or 14T in the recording pulse generated with a strategy during recording.

Accordingly, a pattern shown in FIG. 34(b), wherein the variable mark MzT has a length of 3T, is set as a reference pattern, and the rest of the patterns shown in FIGS. 34(c) to (f) as comparison patterns. Then, by comparing each of the comparison patterns with the reference pattern in terms of the fixed space length SyT, a front-side phase shift length FPS4T to FPS7T relative to the reference pattern is obtained as shown in each of the diagrams.

Because it is only necessary to detect each of the shift lengths FPS3T to FPS7T as a value relative to any position, the front-side phase shit length FPS3T of the reference pattern may be defined as zero or a shift length from the ideal length. Also, instead of the pattern in FIG. 34(b), one of the patterns shown in FIGS. 34(c) to (f) may be selected as a reference pattern.

Figure 35:
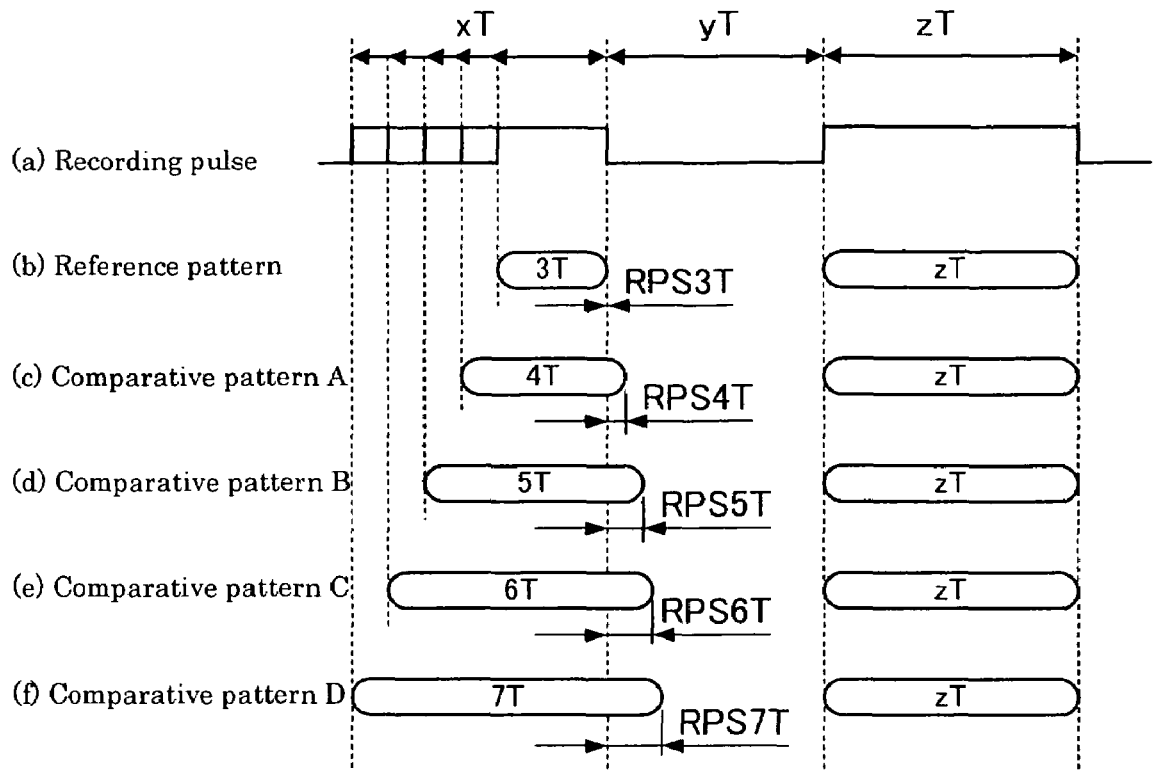
FIG. 35 is a schematic diagram showing an example of a recording pattern and a reproduction pattern that are used for detecting a backside phase shift length of each mark.

FIG. 35 is a schematic diagram showing an example of a recording pattern and a reproduction pattern that are used for detecting a backside phase shift length of each mark. As shown in FIG. 35, in the case of detecting a backside phase shift length of each mark, a test recording is conducted using a recording pulse shown in FIG. 35(a). The recording pulse includes a pattern having a variable mark MxT, a fixed space SyT, and a fixed mark MzT successively and is generated by, while fixing the lengths of the fixed space SyT and the fixed mark MzT, varying the mark length of the variable mark MxT from 3T, 4T, ... to 7T as shown in FIGS. 35(b) to (f). Although not shown in the diagram, the length of the variable mark MxT is varied up to 14T.

When the length of the fixed space SyT in the recording pattern is measured, the length of the fixed space SyT should be constant under an ideal recording condition. However, if the length of the fixed space SyT is shifted from the predetermined ideal length, because the lengths of the mark MzT is fixed, the shift length of each fixed space SyT from the predetermined length corresponds to the back-side phase shift length of each mark, M3T, M4T, ... or M14T, for each unit length 3T, 4T, ... or 14T in the recording pulse generated with a strategy during recording.

Accordingly, after a pattern shown in FIG. 35(b), wherein the variable mark MxT has a length of 3T, is set as a reference pattern and the rest of the patterns shown in FIGS. 35(c) to (f) as comparison patterns, comparing each of the comparison patterns with the reference pattern in terms of the fixed space length SyT enables a back-side phase shift length RPS4T to RPS7T relative to the reference pattern to be obtained as shown in each of the diagrams.

Because it is only necessary to detect each of the shift length RPS3T to RPS7T as a value relative to any position, the backside phase shit length RPS3T of the reference pattern may be defined as zero or a shift length from the ideal length. Also, instead of the pattern in FIG. 35(b), one of the patterns shown in FIGS. 35(c) to (f) may be selected as a reference pattern.

Figure 36:
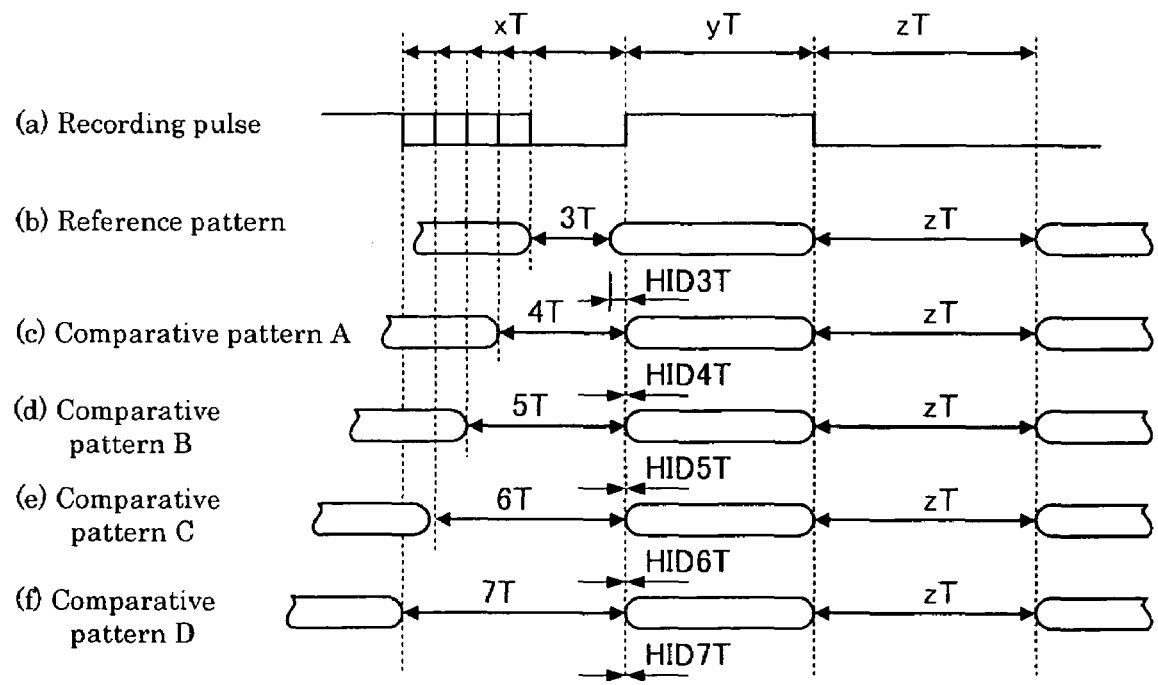
FIG. 36 is a schematic diagram showing an example of a recording pattern for detecting a mark shift length due to heat interference.

FIG. 36 is a schematic diagram showing an example of a recording pattern for detecting a shift length of each mark due to heat interference. As shown in FIG. 36, in the case of detecting a shift length of a mark due to heat interference, a test recording is conducted using the recording pulse shown in FIG. 36(a). The recording pulse includes a pattern having a space SxT, a mark MyT, and a space SzT successively and is generated by, while fixing the lengths of the fixed mark MyT and the fixed space SzT, varying the space length of the variable space SxT from 3T, 4T, ... or 7T as shown in FIGS. 36 (b) to (f). Although not shown in the diagram, the length of the variable space SxT is varied up to 14T.

When the length of the fixed mark MyT in the recording pattern is measured, it should be constant under an ideal recording condition. However, if the length of the fixed mark MyT is shifted from the predetermined ideal length, because the lengths of the space SzT is fixed, the shift length of the fixed mark MyT from the predetermined length corresponds to the shift length due to heat interference arising from a mark formed right before the variable space SxT.

Accordingly, after a pattern shown in FIG. 36(b), wherein the variable space SxT has a length of 3T, is set as a reference pattern and the rest of the patterns shown in FIGS. 36(c) to (f) as comparison patterns, comparing each of the comparison patterns with the reference pattern in terms of the fixed mark length MyT enables a front-side phase shift length HID3T to HID7T relative to the reference pattern to be obtained as shown in each of the diagrams.

Because it is only necessary to detect each of the shift lengths HID3T to HID7T as a value relative to any position, the front-side phase shit length HID3T of the reference pattern may be defined as zero or a shift length from the ideal length. Also, instead of the pattern in FIG. 36(b), one of the patterns shown in FIGS. 36(c) to (f) may be selected as a reference pattern.

FIG. 37 is a schematic diagram showing a table configuration for searching a specific pattern used in the detection of a front-side or backside phase shift length of a mark. In the case of detecting a front-side phase shift of a mark, data stored in the storage area 115 shown in FIG. 7 are searched according to a threshold range shown in FIG. 37(a) for a mark MxT, a space SyT, or a mark MzT defined for each specific pattern (step S422 in FIG. 28), and a data string that satisfies the threshold range is extracted.

Subsequently, count results for each of the mark MxT, space SyT, and mark MzT are sorted and averaged (step S424 in FIG. 28). By conducting the above-described pattern comparison using the averages of the count results, a front-side phase shift length of each of the marks is obtained. FIG. 37(b) shows an example of a threshold in the case of detecting a backside phase shift of a mark, and the concept and operations involved in the diagram are the same as in the case of detecting a front-side phase shift of a mark.

Figure 38:
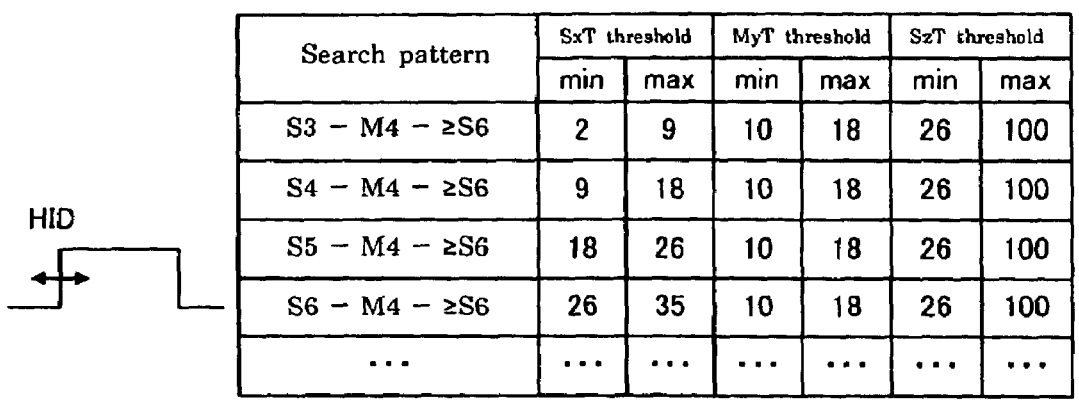
FIG. 38 is a schematic diagram showing a table configuration for searching a specific pattern to be used in the detection of a shift length of a mark due to heat interference.

FIG. 38 is a schematic diagram showing a table configuration for searching a specific pattern used in the detection of a shift length of a mark due to heat interference. As shown in FIG. 38, a detection of a shift due to the heat interference is conducted by the same procedures as in the case of detecting the front-side or backside phase shift of a mark described in FIG. 37.

Figure 39:
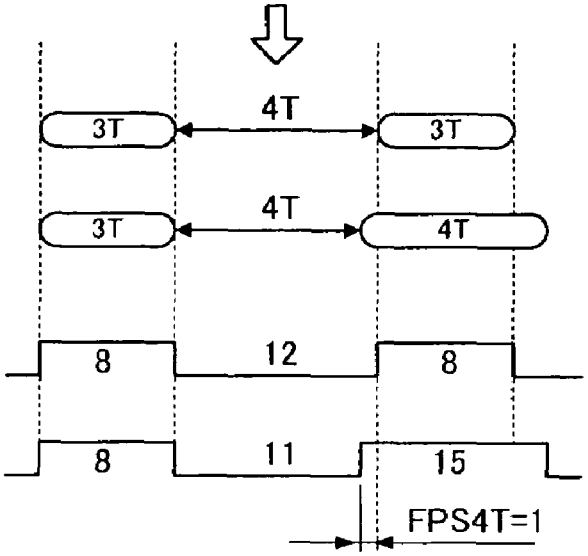
FIG. 39 is a schematic diagram showing a specific example of detecting a shift length by the comparison of count results.

FIG. 39 is a schematic diagram showing a specific example of detecting a shift length by the comparison of count results. The diagram shows an example of detecting a front-side phase shift of a mark, but the same method is also applied to the detection of other shift lengths. In the case of detecting a shift length by the comparison of count results, a reference pattern and a comparison pattern shown in FIGS. 39(a) and (b) respectively are searched in and extracted from data stored in the storage area, and then count values for a part supposed to have a fixed length are compared. In the example shown in the diagram, a space SyT is used as a reference length for the comparison. Thus, the count result of "12" shown in FIG. 39(c) for the reference pattern and that of "11" shown in FIG. 39(d) for the comparison pattern are compared with each other to obtain the difference, and the obtained difference of "1" is the value of a shift length FPS4T.

Figure 40:
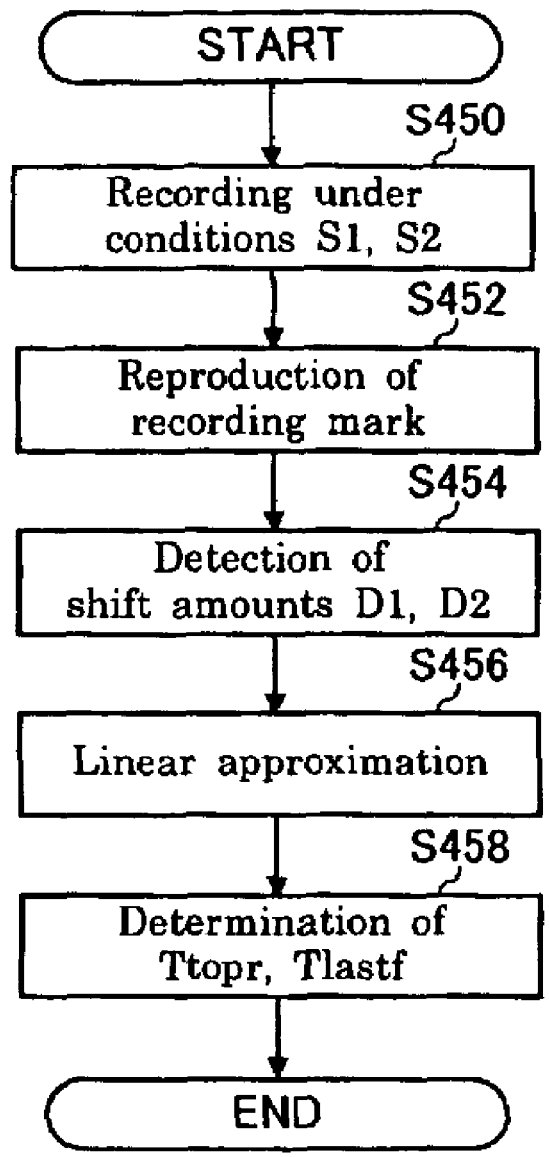
FIG. 40 is a flowchart showing an example of the determination of Ttopr and Tlastf by predicting a control amount shown in FIG. 28.

FIG. 40 is a flowchart showing an example of the determination of Ttopr and Tlastf by predicting a control amount shown in FIG. 28. As shown in FIG. 40, a control amount is predicted by implementing a series of steps of: conducting a test recording under two or more types of recording conditions including S1 and S2 (step S450); reproducing the recording marks obtained by the test recording (step S452); comparing the obtained reproduction patterns in order to find a shift length D1 under the condition of S1 and a shift length D2 under the condition of S2 (step S454); then linearly approximating the relationship between (S1, D1) and (S2, D2) (step S456); and finally determining optimum Ttopr and Tlastf using the linearly approximated line (step S458).

Figure 41:
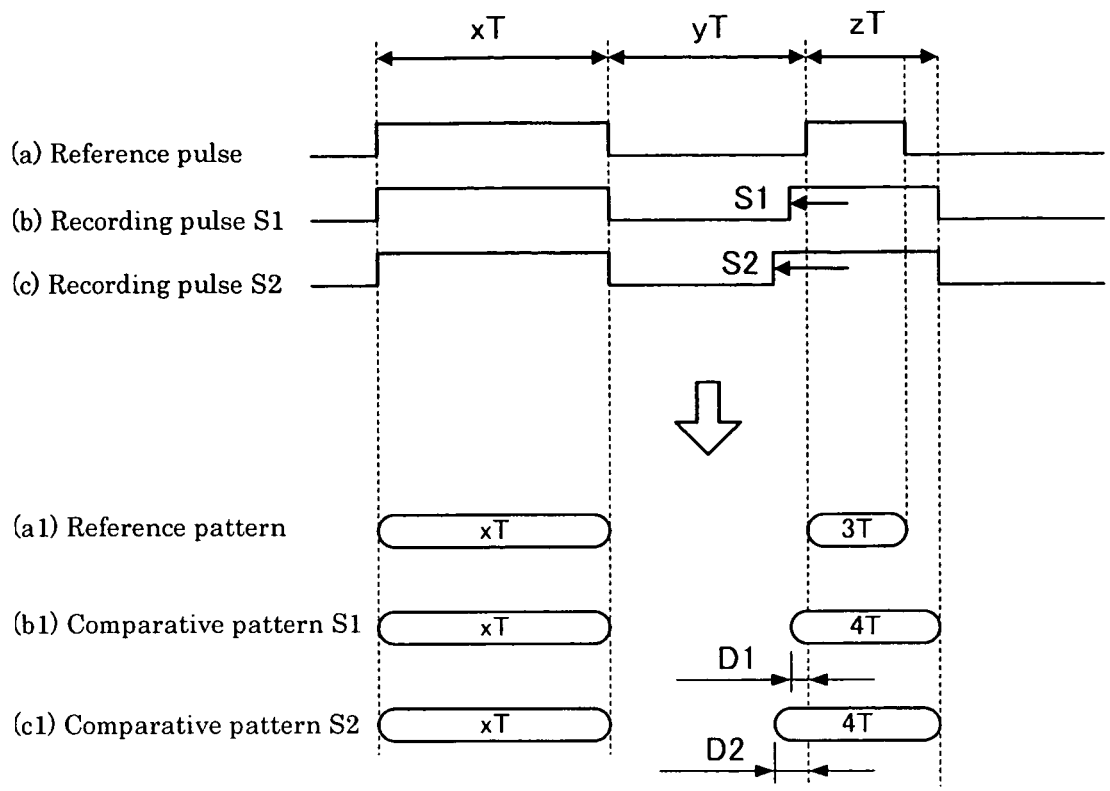
FIG. 41 is a schematic diagram showing a relationship between the variation in recording condition (S1 and S2) and the corresponding shift length (D1 and D2).

FIG. 41 is a schematic diagram showing a relationship between the variation in recording condition (S1 and S2) and the corresponding shift length (D1 and D2). A recording pulse having "MzT=3T" is used as a reference pulse, and two recording pulses of "MzT=4T," which are obtained by shifting front edges of MzTs by S1 and S2 respectively as shown in FIGS. 41(b) and (c), are used as recording pulses to be compared. Then, test recordings are conducted using these recording pulses.

As a result, a reference pattern shown in the FIG. 41(a1) is obtained correspondingly to a recording pulse shown in FIG. 41(a), and a comparison pattern S1 in FIG. 41(b1) correspondingly to a recording pulse in FIG. 41(b), and a comparison pattern S2 in FIG. 41(c1) correspondingly to a recording pulse in FIG. 41(c). A shift length D1 is caused by the control amount S1 in the comparison pattern S1, and a shift length D2 by the control amount S2 in the comparison pattern S2.

When the shift lengths D1 and D2 corresponding to the control amounts S1 and S2 respectively are obtained, a shift length caused by applying a control amount to any of the parameters becomes predictable. Accordingly, a prediction of a control amount and determination of a correction value are conducted using the relationship between the control amount and the shift length.

Figure 42:
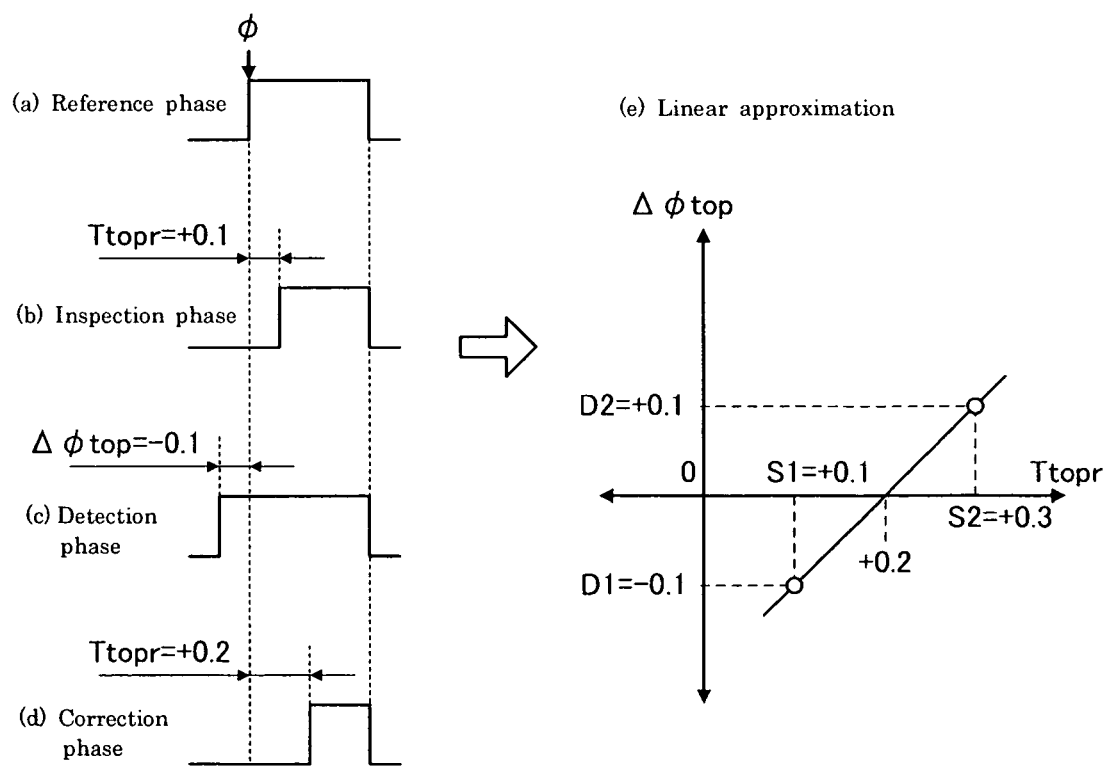
FIG. 42 is a schematic diagram showing an example of correcting a front-side phase shift using a linear approximation.

FIG. 42 is a schematic diagram showing an example of correcting a front-side phase shift using a linear approximation. In the case of determining a correction amount Ttopr for a front-side phase shift, as shown in FIG. 42(a), a test recording is conducted first with a pulse shape having a pulse position shifted relative to a reference phase φ by an amount of Ttopr as shown in FIG. 42(b) (recording condition S1 or S2). Consequently, as shown in FIG. 42(c), a phase sift Δφtop for the obtained reproduction signal is detected (shift length D1 or D2).

In the example shown in FIG. 42, varying the control amount Ttopr from S1=+0.1 to S2 =+0.3 results in the variation of a phase shift Δφtop as D1=−0.1 to D2=+0.1.Then, using the obtained (S1, D1) and (S2, D2), the relationship between the control amount Ttopr and the resulting phase shift Δφtop is linearly approximated as shown in FIG. 42(e), and the approximated line is used to find a correction phase Ttopr=+0.2 as an optimum correction amount, with which a phase shift is canceled.

As described above, a linear or curve approximation can be applied to the relationship between the variations in strategy (S1 and S2) and in shift length (D1 and D2) when at least two points for each of the variations are obtained, and the approximated line (curve) enables to find an optimum correction amount with which a shift length becomes zero.

Specifically, obtaining several shift lengths D by varying a strategy S; substituting several sets of the strategy S and the corresponding shift length D into a general expression of "D=a·S+b"; and solving simultaneous equations obtained by the substitution enable the constants a and b in the expression to be determined, resulting in the determination of a strategy S for an ideal shift length D. Applying the strategy S to the strategy circuit 102 shown in FIG. 7 enables a recording pulse to be optimally corrected.

For example, assuming that the recording shift detection part 112 shown in FIG. 7 detects a shift length as D1 from a reproduction pattern of a test recording using a strategy S1 and that as D2 using the other strategy S2, the following simultaneous equations are obtained:

$D1=a·S1+b$, and $D2=a·S2+b$.

From the above equations, the constants a and b are deduced, whereby the following relationship between S and D is obtained:

$S=(D-b)/a$.

Substituting an output shift length D for improving recording quality, for example, an output shift length for correcting an initial output shift length arising in an equalizer or the like, into the above relationship enables an optimum strategy S to be determined.

In addition, the relationship to determine an optimum strategy S may be obtained for each of the marks M3T, M4T, . . . and M14T having the length of 3T, 4T, . . . and 14T respectively. Further, it may also be obtained for each recording speed.

Figures 43, 44:
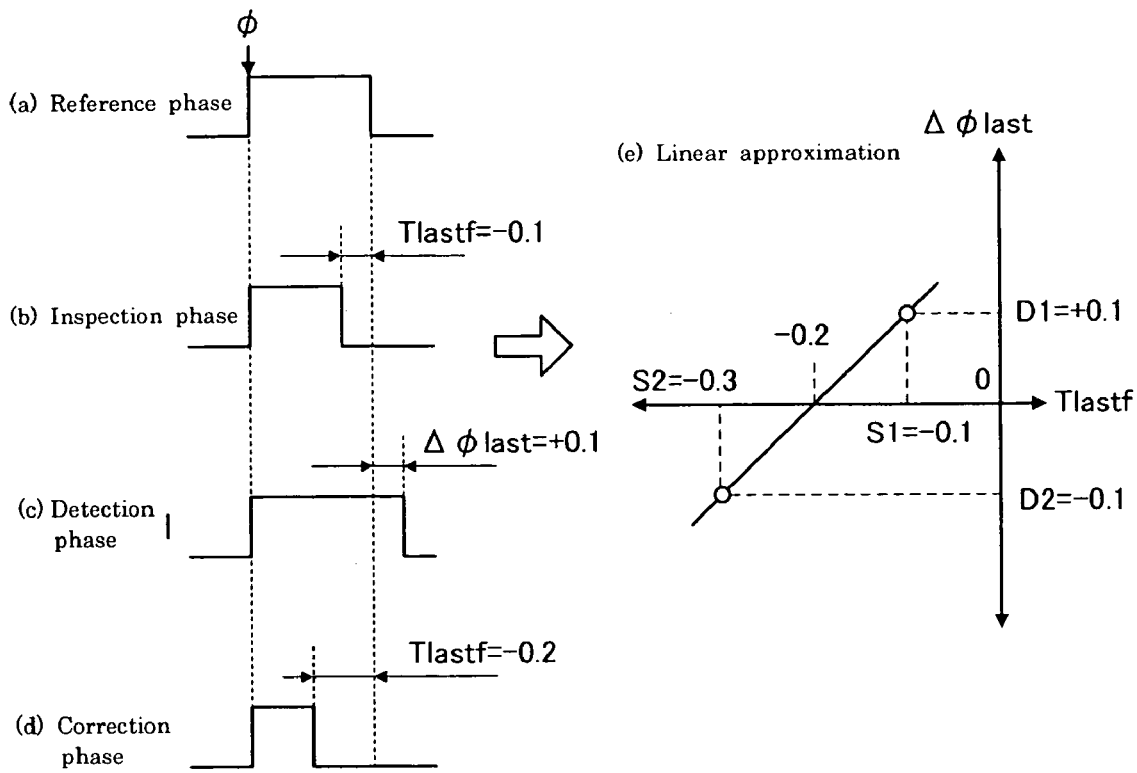
FIG. 43 is a schematic diagram showing an example of correcting a backside phase shift using a linear approximation.
FIG. 44 is a schematic diagram showing a table configuration for storing correction amounts Ttopr and Tlastf.

FIG. 43 is a schematic diagram showing an example of correcting a backside phase shift using a linear approximation. In the case of determining a correction amount Tlastf for a back-side phase shift, as shown in FIG. 43(a), a test recording is conducted first with a pulse shape having a pulse position shifted relative to a reference phase φ by an amount of Tlastf as shown in FIG. 43(b). Consequently, as shown in FIG. 43(c), a phase shift Δφlast for a reproduction signal is detected.

In the example shown in FIG. 43, varying the correction amount Tlastf from S1=−0.1 to S2=−0.3 results in the variation of a phase shift Δφlast as D1=+0.1 to D2=−0.1.Then, using the obtained (S1, D1) and (S2, D2), the relationship between the control amount Tlastf and the resulting phase shift Δφlast is linearly approximated as shown in FIG. 43(e), and the approximated line is used to find a correction phase Tlastf=−0.2 as an optimum correction amount, with which a phase shift is canceled.

FIG. 44 is a schematic diagram showing a table configuration for storing correction amounts Ttopr and Tlastf As shown in FIG. 44(a), the correction amount Ttopr is defined for each mark length to be corrected in combination with a space length located before the mark. For example, when a mark to be corrected has a length of 3T and a space before the mark has a length of 3T, a correction amount is stored in an area indicated as "3-3" in FIG. 44(a). Similarly, when a mark to be corrected has a length of 4T and a space before the mark has a length of 3T, a correction amount is stored in an region indicated as "3-4" in the diagram. In the same manner as the case of 3T or 4T, for each of the mark lengths 5T to 14T, a correction amount Ttopr is stored correspondingly to a space length located before the mark.

Further, as shown in FIG. 44(b), the correction amount Tlastf is defined for each mark length to be corrected in combination with a space length located after the mark. For example, when a mark to be corrected has a length of 3T and a space after the mark has a length of 3T, a correction amount is stored in an area indicated as "3-3" in FIG. 44 (b). Similarly, when a mark to be corrected has a length of 4T and a space after the mark has a length of 3T, a correction amount is stored in an area indicated as "3-4" in FIG. 44(b). In the same manner as the case of 3T or 4T, for each mark length 5T to 14T, a correction amount Tlastf is stored correspondingly to a space length after the mark.

Figure 45:
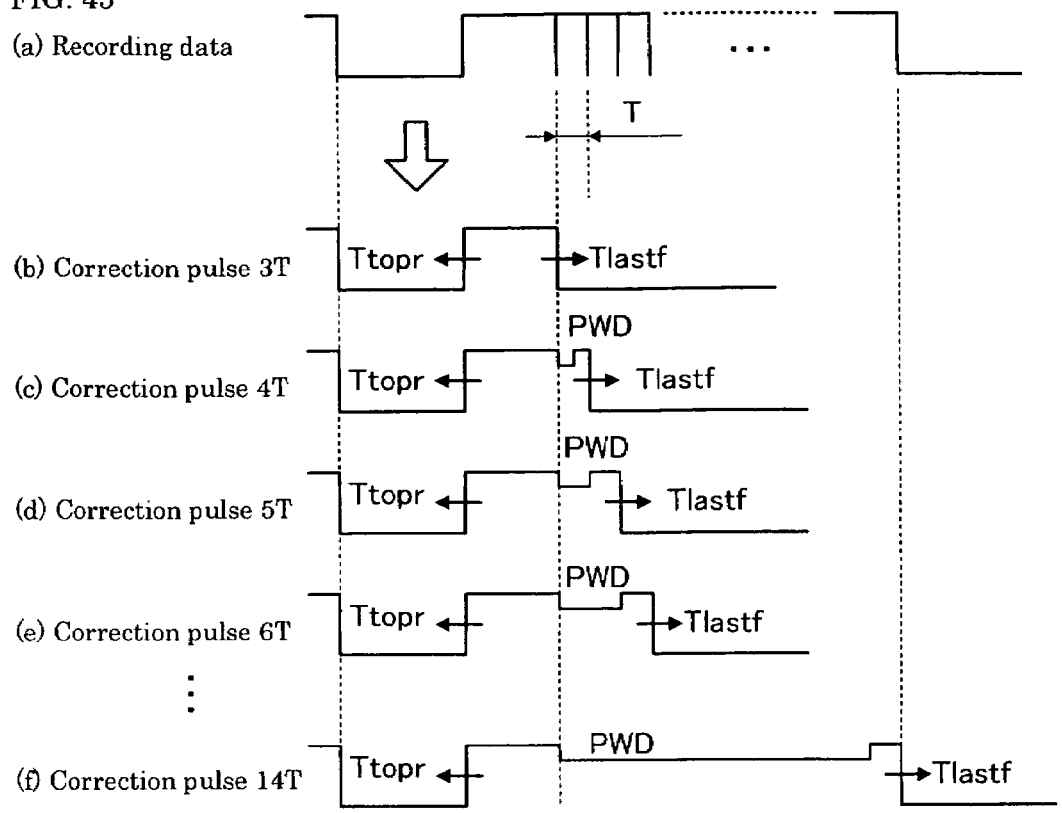
FIG. 45 is a schematic diagram showing an example of a corrected single pulse.

FIG. 45 is a schematic diagram showing an example of a corrected single pulse. As shown in FIGS. 45(a) to (f), when recording data in FIG. 45(a) are recorded onto an optical disk, a strategy to which an optimum correction value is applied is set for each mark length. For example, in the case of recording a 3T mark as shown in FIG. 45(b), a front correction value Ttopr of the 3T mark is read out correspondingly to the length of a space before the mark as well as a rear correction value Tlastf of the 3T mark is read out correspondingly to the length of a space after the mark, from the table shown in FIG. 44. Then, the front and rear ends of the recording pulse are corrected with the Ttopr and Tlastf respectively.

Also, in the case of correcting marks having a length of 4T or longer, as shown in FIGS. 45(c) to (f), a PWD correction value for each mark length is read out from a predetermined table in addition to the Ttopr and Tlastf, and the pulse shape is corrected correspondingly to the PWD value.

Figure 46:
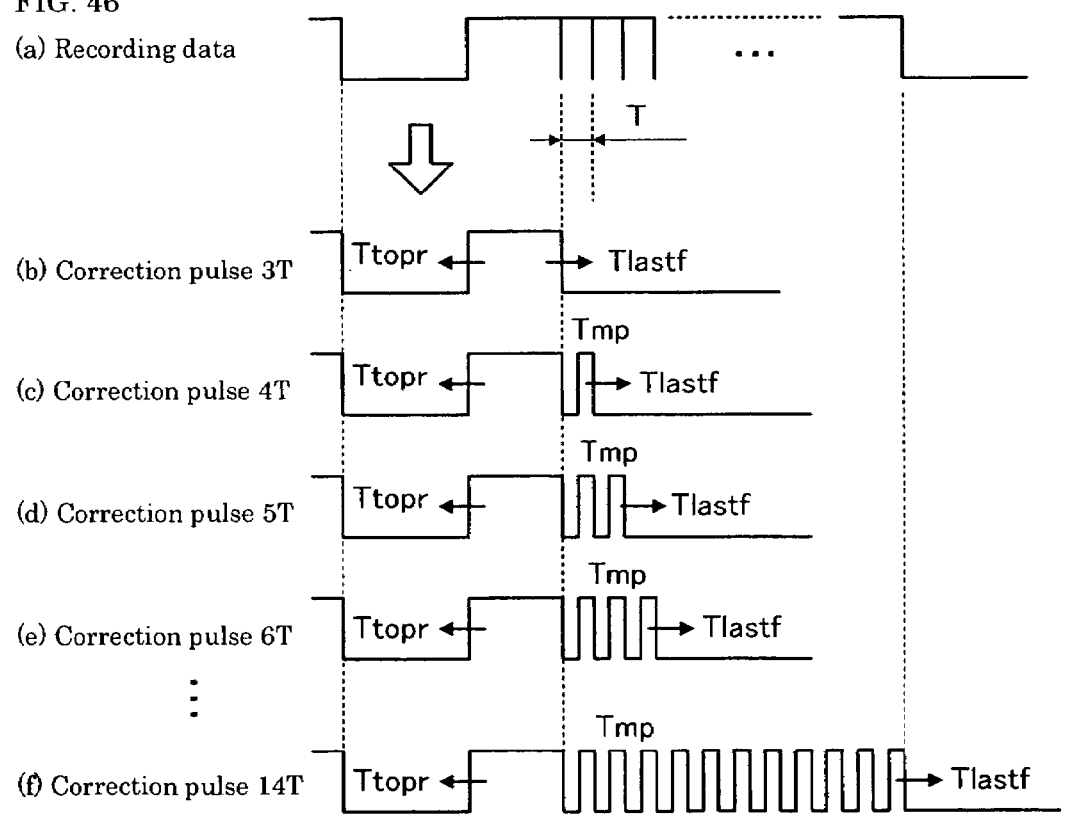
FIG. 46 is a schematic diagram showing an example of a corrected multipulse.

FIG. 46 is a schematic diagram showing an example of a corrected multipulse. In the case of correcting a multipulse as shown in FIG. 46, instead of the PWD correction value used for correcting a single pulse as described above, a Tmp correction value is read out from a predetermined table, and the pulse shape is corrected correspondingly to the Tmp value. Other steps are the same as in the single pulse case.

In addition, the above-described embodiment shows the case wherein an optimum strategy S is determined by substituting the shift length D into the relationship to find an optimum strategy, however, an optimum strategy S may be determined by using a correction table preliminary obtained with the relationship.

Further, the above-described procedure of setting an optimum strategy may be conducted every time the type of optical disk is changed, or as a recording speed is changed. Also, under the condition that optimum strategy conditions for various types of optical disks or recording speeds, which are determined by the above-described procedure of setting an optimum strategy, are preliminarily stored into a memory, when recording onto one of the optical disk types or at one of the recording speeds stored in the memory, the corresponding optimum strategy stored in the memory may be read out and used.

Certain embodiments enable a recording condition closer to an optimum to be obtained even for a medium unknown to a drive, and therefore could be applied to severer recording environments.

What is claimed is:

1. In an optical information recording device that records information onto an optical recording medium by irradiating a laser beam based on a recording pulse corresponding to each of multiple types of codes, the recording pulse comprising a top pulse, an intermediate pulse, and a last pulse, a method of setting a recording condition, comprising:
   configuring a reference condition for the recording pulse;
   configuring a condition for the last pulse after configuring the reference condition; and
   configuring a condition for the intermediate pulse after configuring the last pulse,
   wherein the condition for the last pulse is determined based on a positional relationship between the amplitude of a signal obtained by reproducing the shortest code and that obtained by reproducing the second shortest code, and the condition for the intermediate pulse is determined based on a positional relationship between the amplitude of a signal obtained by reproducing the shortest code and that obtained by reproducing a code of which the amplitude of a reproduction signal is comparable to that of a longest code.

2. The method of claim 1, wherein the reference condition is configured based on a result of a test recording onto the medium, the width of the last pulse is configured based on a result of a test recording using the reference condition, and the condition for the intermediate pulse is configured based on a test recording using the width of the last pulse.

3. The method of claim 1, wherein the reference condition comprises a condition for the top pulse.

4. The method of claim 1, wherein the reference condition comprises a power of the recording pulse.

5. An optical information recording device containing processing circuitry configured to perform any of the methods of claims 1-4.

6. A processing circuit configured to be incorporated into an optical information recording device, where said processing circuit is configured to perform any of the methods of claims 1-4.

* * * * *